(12) United States Patent
Vincelette

(10) Patent No.: US 10,573,091 B2
(45) Date of Patent: Feb. 25, 2020

(54) SYSTEMS AND METHODS TO CREATE A VIRTUAL OBJECT OR AVATAR

(71) Applicant: Andre R. Vincelette, Deux-Montagnes (CA)

(72) Inventor: Andre R. Vincelette, Deux-Montagnes (CA)

(*) Notice: Subject to any disclaimer, the term of this patent is extended or adjusted under 35 U.S.C. 154(b) by 0 days.

(21) Appl. No.: 15/902,914

(22) Filed: Feb. 22, 2018

(65) Prior Publication Data

US 2018/0240281 A1 Aug. 23, 2018

Related U.S. Application Data

(60) Provisional application No. 62/462,038, filed on Feb. 22, 2017.

(51) Int. Cl.
*G06T 19/20* (2011.01)
*G06T 17/00* (2006.01)
*G06T 15/50* (2011.01)
*G06T 15/20* (2011.01)

(52) U.S. Cl.
CPC .......... *G06T 19/20* (2013.01); *G06T 15/20* (2013.01); *G06T 15/50* (2013.01); *G06T 17/00* (2013.01); *G06T 2207/10028* (2013.01)

(58) Field of Classification Search
CPC .......... G06T 19/20; G06T 2207/10028; G06T 17/00; G06T 15/50; G06T 15/20
See application file for complete search history.

(56) References Cited

U.S. PATENT DOCUMENTS

2016/0088284 A1* 3/2016 Sareen .................. G06N 3/006
348/47
2017/0262992 A1* 9/2017 Bourmaud ............. G06T 7/285

OTHER PUBLICATIONS

Rusu et al., "Aligning Point Cloud Views Using Persistent Feature Histograms", IEEE, 2008. (Year: 2008).*
Devrim Akca, "Matching of 3D Surfaces and Their Intensities", ScienceDirect, 2007. (Year: 2007).*
Yoshida et al. ("Registration of Range Images Using Texture of High-Resolution Color Images", IAPR Workshop on Machine Vision Applications, 2002. (Year: 2002).*
Johnson et al., "Registration and Integration of Textured 3-D Data", 1997. (Year: 1997).*

* cited by examiner

*Primary Examiner* — Nicholas R Wilson

(57) ABSTRACT

A system for generating virtual objects, including personalized avatars. The system comprises modules for acquiring a plurality of series of bi-dimensional images, deriving point clouds and point cloud three-dimensional models therefrom and generating a global point cloud three-dimensional model by computing a weighted average.

12 Claims, 8 Drawing Sheets

SYSTEMS AND METHODS TO CREATE A VIRTUAL OBJECT OR AVATAR

CROSS-REFERENCE TO RELATED APPLICATIONS

The present application claims priority to and expressly incorporates by reference herein the entire disclosure of U.S. Provisional Patent Application No. 62/462,038, filed Feb. 22, 2017.

FIELD OF THE INVENTION

The present invention generally relates to systems and methods for generating virtual objects. In a specific and non-limiting example of implementation, the present invention finds applications in the field of personalized avatars.

BACKGROUND OF THE INVENTION

The present invention generally relates to simulations, virtual world simulations, of the real-world or real-life, and more particularly systems and methods for creating virtual objects and avatars.

Activities in the virtual space are increasing due to advance in computers and the World Wide Web. More and more commercial transactions and customer decisions are made in the virtual sphere rather than through real person-to-person interaction. In fact, e-shopping has become a preferred way of purchasing goods for many consumers. In many instances, and once a customer has selected a desired product, the customer will validate its selection by physically examining the product in a store where the customer is able to look at the product through various perspectives. This results from a lack of realistic representation of the product in the virtual share.

There is accordingly a need to improve virtual representations of objects to reduce the need for physical examination in the real world. One of the main limitations of the virtual space is that three-dimensional objects are represented via bi-dimensional display screen images. Three-dimensional point cloud models are particularly suited to add a third dimension to these bi-dimensional images. Perspective viewing algorithms associated with such three-dimensional point cloud models already exist. Using these, a given object may be represented by a point cloud three-dimensional model and various algorithms may be used to manipulate such models.

Point cloud three-dimensional models may be generated using a number of three-dimensional scanning techniques. One approach described by Hu and al. in U.S. Pat. No. 9,230,325 is photogrammetry using geometrical topography triangulation. Two or more cameras with different direct perspectives can be used to obtained stereoscopy as described by Peuchot in French Patent No. 2,986,626. Alternatively, stereoscopy can also be obtained by using mirrors and reflective surfaces in the viewing path as described by Tanaka and al. in U.S. Patent Application Publication No. 2013/0335532. Patterned or structured light can also be projected onto the object to obtain depth information and ease up photogrammetry multiple perspectives reconstruction as described by Schneider and al. in U.S. Pat. No. 9,228,697. Other approaches may also be used, such as sonar or lidar time of flight based techniques, where delay of echoes are used to calculate the distance between the reflecting surface and the capture device, as described by Meinherz in U.S. Pat. No. 9,332,246. Using the above techniques, the three-dimensional models are generated directly based on the set of captured points, thereby incorporating any measurement error and/or aberration into the three-dimensional model itself. The quality of the model is therefore directly related to the quality of the acquired points. In addition, these generalist approaches do not used pre-knowledge to evaluate the relevance of the acquired points. For example, when building a three-dimensional model of the object, the background is also acquired and must be erased using post-processing techniques.

With users spending more and more time in the virtual space, there is also a need for realistic representations of individuals, including individuals' faces, also called avatars. The three-dimensional scanning techniques described above can also be used to generate personalized avatars in specific poses. To interact in the virtual space, these personalized avatars must be able to move and express themselves. There is accordingly also a need to derive other personalized characteristics from the individuals. Sareen and al. disclose in U.S. Patent Application Publication No. 2016/0247017 how to compute biometric parameters from acquired avatars. Davis proposes in U.S. Patent Application Publication No. 2013/0257877 to build a general look-up table to store captured characteristics, from which a personality characteristics library is derived. This very generic approach is applied for avatars mimicking real protagonists during an online interaction. Similarly, Goodman and al. propose in U.S. Pat. No. 8,970,656 to use facial expression mimicking avatars library for video conferencing. Evertt and al. propose in U.S. Pat. No. 9,013,489 to animate an avatar overlaying a stick figure mimicking a stereo-filmed person. These approaches can offer a certain level of personalization by reproducing visually-observed poses and expressions from a library however they are unable to realistically reproduce motions and expressions of a person without having the specific motions and expressions in the library.

There is accordingly a need for virtual object creation systems and methods that do not exhibit the above shortcomings. The present invention is directed to a virtual object creation system which generates point cloud three-dimensional models that extend beyond the directly acquired visual information by using weighted average and residue minimization computer programs. The virtual object creation system of the present invention is also directed to specific articulation modeling between portions/sub-portions of the model and physical properties particularly suited for avatar animation, with specific parameterization derived from poses protocols during image acquisition.

SUMMARY OF THE INVENTION

In one non-limiting embodiment there is provided a virtual object creation system in accordance with the present disclosure.

BRIEF DESCRIPTION OF THE DRAWINGS

A detailed description of non-limiting examples of implementation of the present invention is provided hereinbelow with reference to the following drawings, in which.

DETAILED DESCRIPTION

Figure 1:
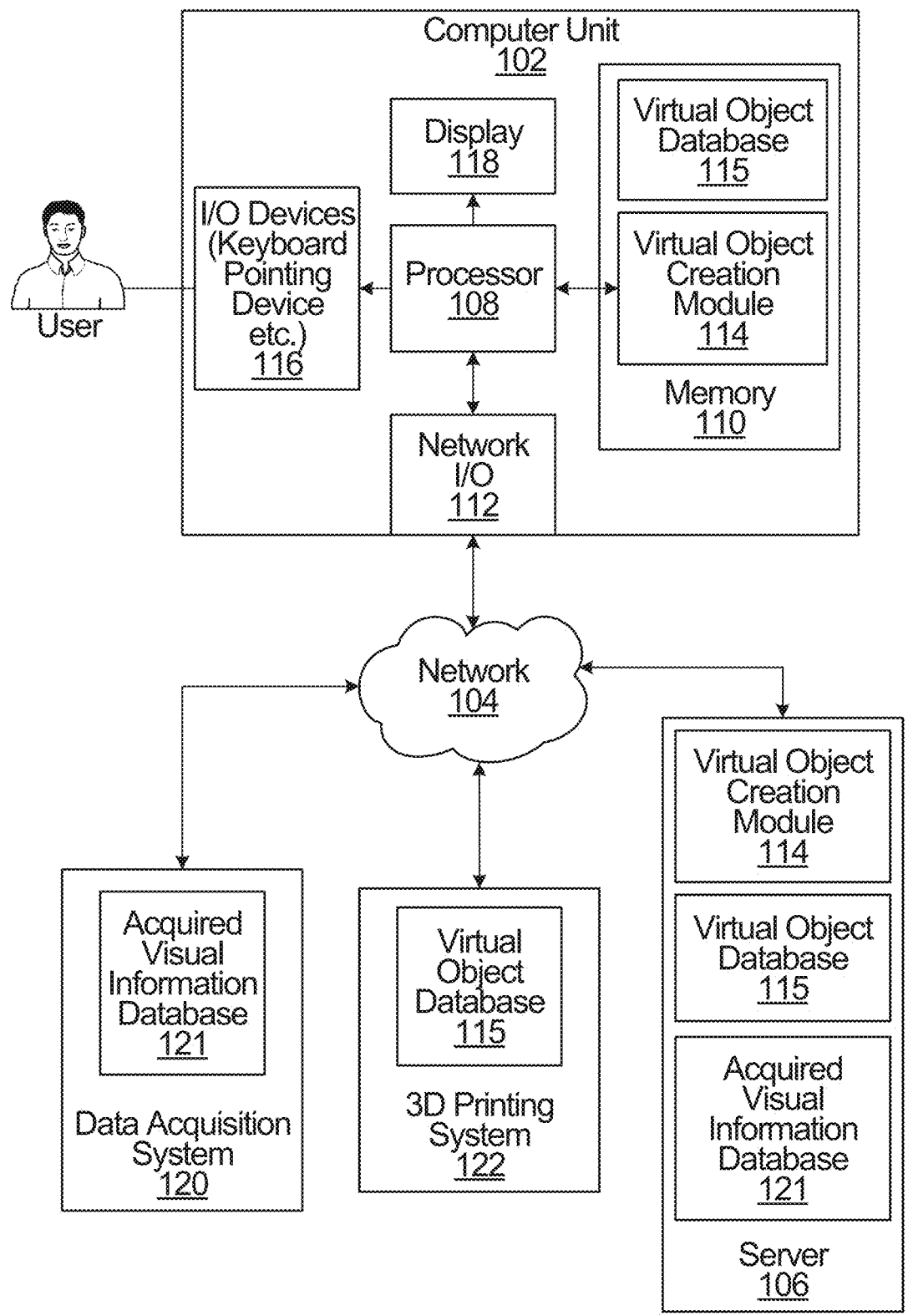
FIG. 1 shows a block diagram of a virtual object creation system in accordance with a non-limiting embodiment of the invention.

To facilitate the description, any reference numeral designating an element in one figure will designate the same element if used in any other figure. In describing the embodiments, specific terminology is used but the invention is not intended to be limited to the specific terms so selected.

Shown in FIG. 1 is a virtual object creation system 100 in accordance with a non-limiting embodiment of the present invention. As shown, the virtual object creation system 100 comprises a computer unit 102 connected to a network 104. The network 104 may be a data communication network interconnecting the computer unit 102 with a server 106. More specifically, the network 104 may be a public network, such as the Internet, in which case the virtual object creation system 100 may connect via Internet Service Provider (ISP). Alternatively, the network 104 may be implemented as a network other than the Internet such as an interactive television network, a private network such as Intranet, a local area network (LAN), a wide area network (WAN), a Virtual Private Network (VPN), or any other suitable network.

The computing unit 102 is generally in the form of a personal computer, although other types of computing units 102 may be used including laptops, notebooks, hand-held computers, set top boxes and the likes. The computing unit 102 may be connected to other computing units over an Intranet (not shown) or may be a stand-alone computing unit. It will be readily apparent that a plurality of computing units 102 is also intended to fall within the scope of the present disclosure. As shown, the computing unit 102 comprises a processor 108, a memory 110 and a network I/O 112 (input/output) for accessing the network 104. The network I/O 112 may be implemented, for example, as a dial-up modem or as a permanent network connection or as an internet connection via an ISP. The processor 108 may be a central processing unit (CPU) and may be adapted to execute computer program elements stored in the memory 110 for performing certain functions, as further described below. More specifically, the memory 110 of the computing unit 102 may comprise a virtual object creation module 114. A user may interact with the computer unit 102 via an I/O device 116. Non-limiting examples of I/O devices 116 comprise keyboards, mouses, touchpads, microphones, voice commands, joysticks, cameras, camera-capture movements and the likes.

The processor 108 may also display visual information on a display 118. Other non-limiting examples of I/O devices 116 include cameras, 3D printers and the likes. In other non-limiting examples, the computer unit 102 may interact with a 3D printing system 122 over the network 104.

The memory 110 may comprise any suitable computer usable or computer readable medium. The computer-usable or computer-readable medium may comprise, but not limited to, an electronic, magnetic, optical, electromagnetic, infrared, or semiconductor system, apparatus or device, or propagation medium. More specific examples of the computer-readable medium would include an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or any other tangible optical or magnetic storage device or transmission media such as those supporting the Internet or an Intranet.

The program elements stored in the memory 110 may be stored in the form of computer program code which may be executed by the processor 108 for carrying out operations of the present invention. The computer program code may be written in an object oriented programming language such as Java, Smalltalk, C++ or the likes. The computer program code for carrying out the invention may also be written in conventional procedural programming language such as "C" programming language, or similar programming languages.

In one non-limiting embodiment, the computer program code may execute entirely on the computer unit 102 when it is stored in memory 110. That is, the virtual object creation module 114 may be stored and executed locally on the computer unit 102. In other non-limiting embodiments, the computer program code may execute partly on the computer unit 102 and on a remote server 106 or entirely on the remote server 106. That is, the virtual object creation module 114 may be stored and executed remotely on the server 106.

The virtual objects generated by the virtual object creation module 100 may be stored in a virtual object database 115. In some non-limiting embodiments, the virtual object database 115 may be stored locally in the memory 110 of the computer unit 102. In other non-limiting embodiments, the virtual object database may be stored remotely on the server 106 and/or on the 3D printing system 122.

Figure 2:
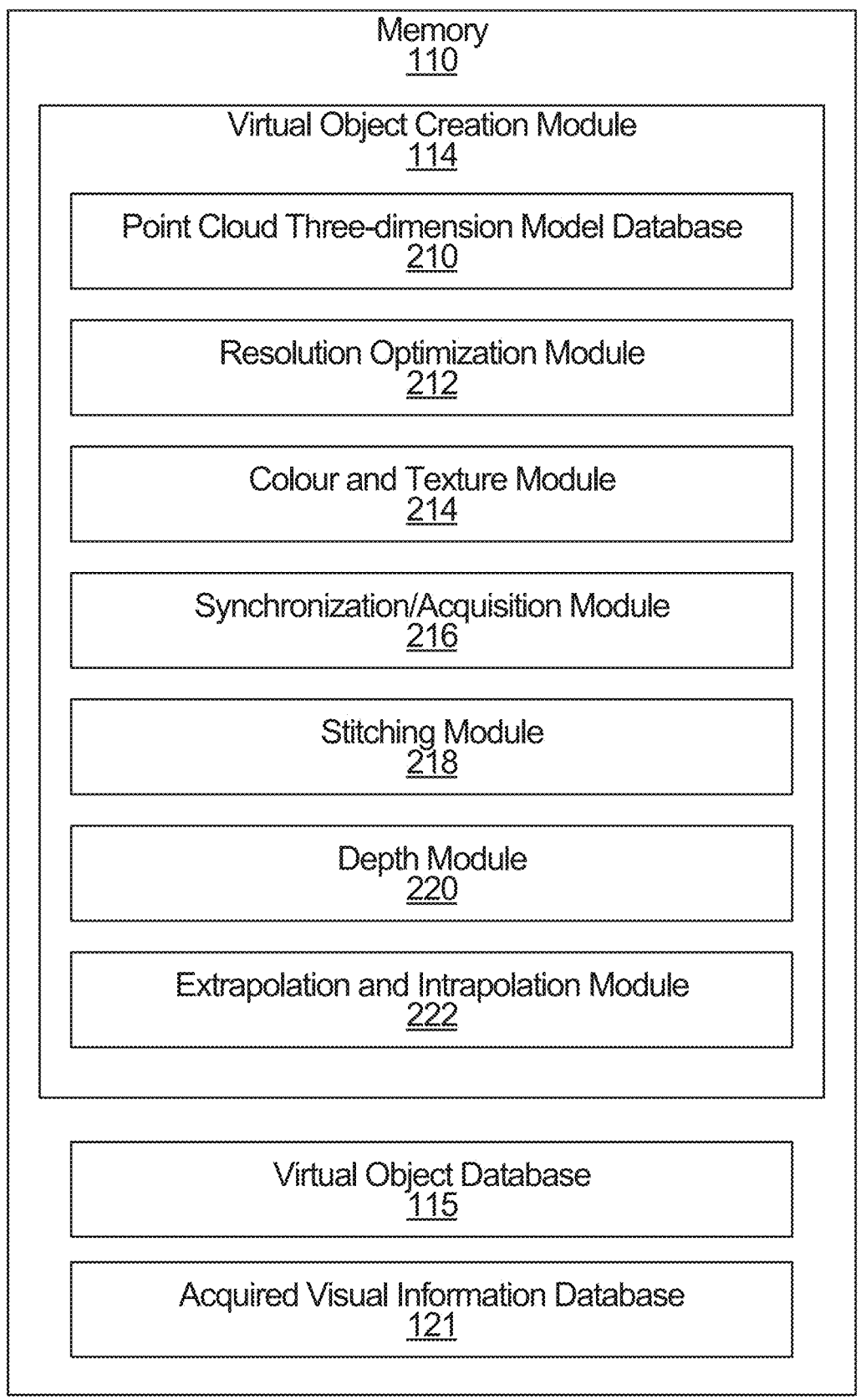
FIG. 2 shows a block diagram of a virtual object creation module in accordance with a non-limiting embodiment of the invention.

With further reference to FIG. 2, in a non-limiting embodiment, the memory 110 may comprise a virtual object creation module 114 and a virtual object database 115. The virtual object creation module 114 may comprise a point cloud three-dimensional model database 210, a resolution optimization module 212, a color and texture module 214, an synchronization/acquisition module 216, a stitching module 218, a depth module 220 and an extrapolation and intrapolation module 222. The virtual object creation module 114 may comprise other modules in other non-limiting embodiments.

In one non-limiting embodiment, visual information regarding a real-life object and/or person may be acquired directly via computer unit 102, more specifically via the synchronization/acquisition module 216 in combination with at least one I/O device 116. In other non-limiting embodiments, the visual information may be acquired by a data acquisition system 120 and communicated to the computer unit 102 via network I/O 112 and network 104. It is appreciated that these variations have no effect on how the visual information is acquired. The acquired visual information may then be stored in an acquired visual information database 121 locally in the memory 110 of the computer unit 102. The acquired visual information database 121 may also be stored directly on the data acquisition system 120 when the visual information is acquired by the data acquisition system 120 or remotely on the server 116 in other non-limiting embodiments.

Figure 3:
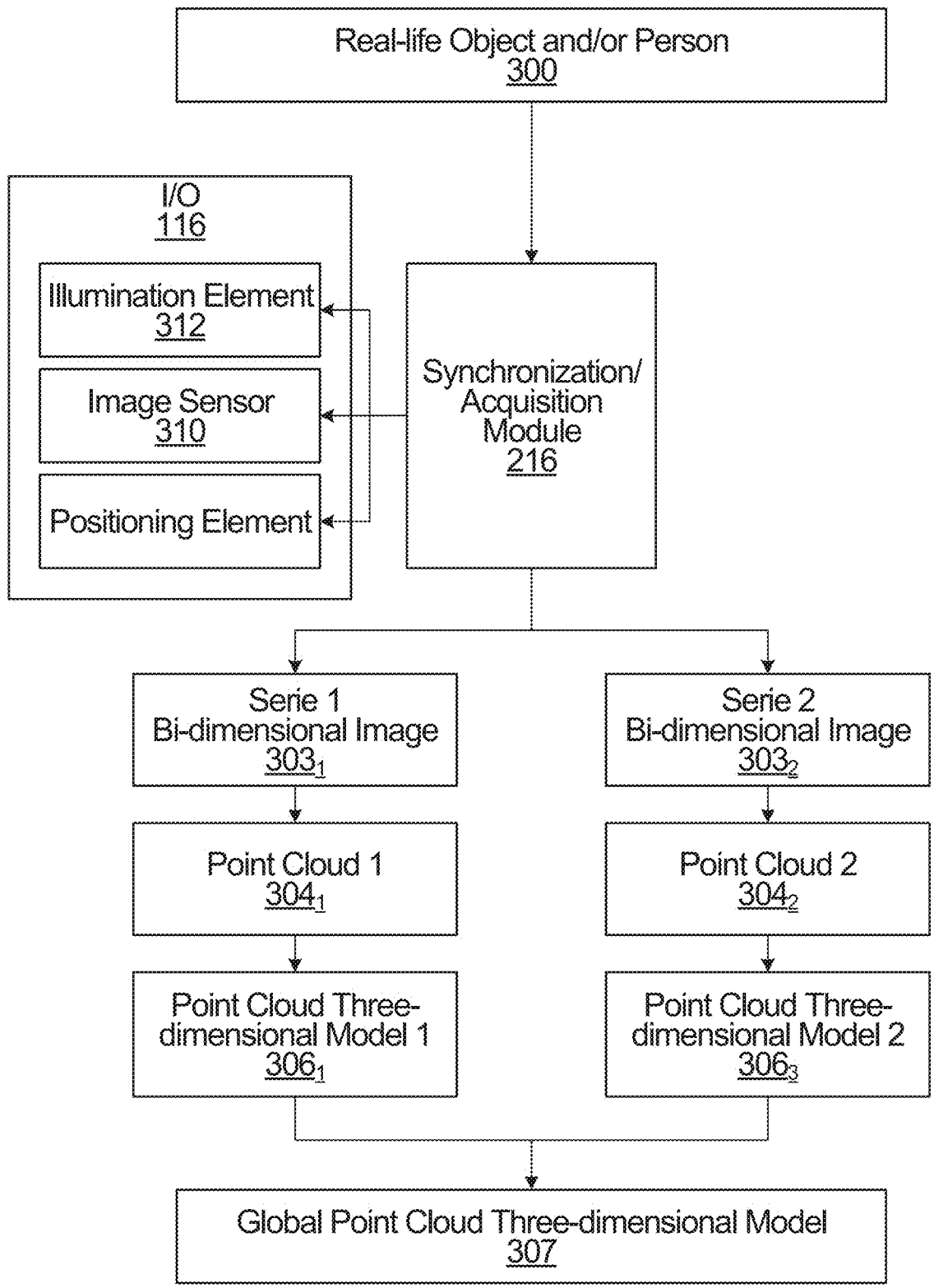
FIG. 3 shows a block diagram of a data acquisition and global point cloud three-dimensional model generation steps in accordance with a non-limiting embodiment of the invention.

With further reference to FIG. 3, in one non-limiting embodiment, the processor 108 may execute in the synchronization/acquisition module 216 a visual data acquisition computer program to control at least one image sensor 310 for the acquisition of visual information as well as an illumination element 312 and a positioning element 314. The image sensor 310 may be an optical instrument for acquiring images, such as, but not limited to, a digital camera operating in the visible spectrum or in any other portion of the electromagnetic spectrum. The illumination element 312 may be a lamp, such as but not limited to an arc lamp, an ultraviolet lamp, a fluorescent lamp, an infrared lamp, a light-emitting diode (LED) or any other suitable lamp or light-generating device. The positioning element 314 may control a position of the image sensor 310 and/or the illumination element 312 relative to a real-life object and/or person 300 to be represented in the virtual space. The positioning element 314 may comprise means to automatically and remotely control a position and an orientation of the image sensor 310 and/or the illumination element 312 relative to the real-life object and/or person 300. In other non-limiting embodiments, the position of the image sensor 310 and/or the illumination element 312 may be controlled directly by a user (i.e., the user may position and orient the image sensor 310 relative to the real-life object and/or person 300 manually).

The synchronization/acquisition module 216 may be configured to acquire a plurality of series of bi-dimensional images $303_1$ of the real-life object and/or person 300 via coordinated control of the image sensor 310, the illumination element 312 and the positioning element 314. In a preferred embodiment, at least two series of synchronized bi-dimensional images $303_1$, $303_2$ may be acquired. The synchronization/acquisition module 216 may further derive from the at least two series of bi-dimensional images $303_1$, $303_2$ at least two datasets of (x, y, z) coordinates, also called "point clouds" $304_1$, representing a plurality of points at a surface of the real-life object and/or person 300. At least two point cloud three-dimensional models $306_1$, $306_3$ corresponding to each one of the point clouds $304_1$, $304_2$ may then be generated. While the at least two point cloud three-dimensional models $306_1$, $306_3$ are representations of the same real-life object and/or person 300, they differ in that they exhibit at least one different property from each other.

The resolution of each one of the at least two point cloud three-dimensional models $306_1$ may be directly correlated to the number of points in each one of the corresponding point clouds $304_1$ (i.e., the point cloud density). That is, the higher the density of the point cloud $304_1$, the higher the resolution of the point cloud three-dimensional model $306_1$ (i.e., the mesh resolution). The mesh of the point cloud three-dimensional models $306_1$ may be defined as the set of faces, vertices and edges that define the three-dimensional shape of the point cloud three-dimensional model $306_1$.

In one non-limiting embodiment, the at least one different property may be a perspective between the at least two point cloud three-dimensional models $306_1$. It is appreciated that each one of the at least two series of bi-dimensional images $303_1$, $303_2$ may only capture a portion of the point cloud $304_1$ given that bi-dimensional images are inherently limited to a single perspective. The other portion of the point cloud $304_1$ may be captured by acquiring another bi-dimensional image from a complementary (or different) perspective. This process may be automated via the perspective element 314 or a user may manually position the image sensor 310 such that a plurality of complementary perspectives may be captured. The relative spatial positions of the points of the point clouds $304_1$ obtained in the series of bi-dimensional images $303_1$ may be determined by either known relative positions between the perspectives or by using sections of the real-life object and/or person 300 overlapping the at least two series of bi-dimensional images $303_1$. The at least two point clouds $304_1$ may accordingly exhibit at least one difference between their respective datasets of (x, y, z) coordinates. The synchronization/acquisition module 216 may then derive at least two point cloud three-dimensional models $306_1$ which are preliminary virtual representations of the real-life object and/or person 300. The at least two point cloud three-dimensional models $306_1$ may be derived using surface fitting algorithms to connect the points in the corresponding datasets of (x, y, z) coordinates. In this non-limiting embodiment, the synchronization/acquisition module 216 may generate for each one of the point clouds $304_1$ a set of surface elements, also called "elementary surface elements", based on the corresponding datasets of (x, y, z) coordinates. These elementary surfaces will provide a visual virtual representation of the real-life object and/or person 300. In some non-limiting embodiments, the elementary surface elements generated may exhibit various shapes such as, but not limited to, triangles, rectangles or any other type of polygons. The elementary surface elements may be flat (in which case two consecutive points are connected by a straight ridge) or curved (in which case two consecutive points are connected by a curve ridge) to match adjacent elementary surface elements along ridges, among others. The curvature of the ridges may be based on quadratic or cubic splines by using consecutive points outside the relevant elementary surface element but along the relevant ridge. In this case, the curvature of the internal portion of the surface element may be an average of the ridges spline coefficients weighted by their relative distances from the specific ridges. Other surface fitting algorithms may be used in other non-limiting embodiments.

In other non-limiting embodiments, the property of the point cloud three-dimensional models $306_1$, $306_3$ may comprise the dataset used for the generation of each point cloud three-dimensional model $306_1$ (e.g., the series of bi-dimensional images $303_1$, the perspective of the bi-dimensional images, the resolution of the bi-dimensional images, the illumination conditions and the likes), the mesh resolution, the type of surface element used (e.g., polygon type, flat/curved, color, texture, intrapolation method and the likes), the continuity methods between surface elements and the likes. The point cloud three-dimensional models $306_1$ may comprise other properties in other embodiments.

As further described below, the at least two point cloud three-dimensional models $306_1$ may be used by the resolution optimization module 212 to generate a global point-cloud three-dimensional model 307 having a resolution efficiently manageable by the processor 108 of the computer unit 102 for displaying the global point-cloud three-dimensional model 307 onto the display 118. The global point cloud three-dimensional model 307 may be stored in a virtual object database 115 locally on the computer unit 102 or remotely via network 104 on the server 106 (e.g., in a cloud-based service), on the 3D printing system 122 and the likes. Storage of and access to the global point cloud three-dimensional model 307 may be secured and transferable and/or modifiable under confidentiality protocols by an authorized user.

Resolution Optimization

The resolution of the global point-cloud three-dimensional model 307 may be optimized by a resolution optimization module 212. In a first non-limiting embodiment, the processor 108 may execute in the resolution optimization module 212 a computer program for computing a weighted average of at least two point cloud three-dimensional models 306$_1$ generated from distinct decimated point clouds 304$_1$. Decimation refers to the process of reducing the number of points in the dataset of (x, y, z) coordinates, or in the point cloud 304$_1$, and may be used to reduce the load on the processor 108 of the computer unit 102 when displaying the global point cloud three-dimensional model 307 onto the display 118.

The point clouds 304$_1$ may be decimated by the resolution optimization module 212 in a number of ways. In some non-limiting embodiments, the point cloud 304$_1$ may be decimated by removing half of the points (i.e., 50% ratio) along each horizontal line along the x axis of the point cloud 304$_1$ (e.g., only the odd or even points may be kept) or by removing half of the points along each horizontal line along the x axis of the point cloud 304$_1$ (e.g., only the odd or even points may be kept). Using this of type of uniform decimation with 50% ratio, and based on a single bi-dimensional image, at least four different decimated point clouds 304$_1$ may be generated: an odd-odd set in (x,y) sequence, an odd-even set in (x,y) sequence, an even-odd set in (x,y) sequence and an even-even set in (x,y) sequence. It is appreciated that other non-uniform decimation schemes with different ratios (e.g., 75%, 25, etc.) may be used in other non-limiting embodiments.

After the point clouds 304$_1$ have been decimated, the weighted average may be computed by the resolution optimization module 212 as follows:

$$\text{Weighted average} = \frac{\sum (\text{point cloud } 3D \text{ model} \times \text{weight})}{\sum (\text{weight})}$$

That is, for each point of each one of the at least two point cloud three-dimensional models 306$_1$, the coordinates in the x, y and z axis may be measured by computing the weighted average of x at (y, z), y at (x, z) and z at (x, y) in each one of the at least two point cloud three-dimensional models 306$_1$ generated from distinct decimated point clouds 304$_1$. It is appreciated that the at least two point cloud three-dimensional models 306$_1$ correspond to the series of bi-dimensional images 303$_1$ acquired by the image sensor 310 via the synchronization/acquisition module 216.

Weight may be attributed in a number of ways. In one non-limiting embodiment, and where the at least two point cloud three-dimensional models 306$_1$ have been derived using surface fitting algorithms producing "flat" elementary surface elements, it is appreciated that the error in the z axis for each point is proportional to the distance between the point in the relevant point cloud three-dimensional model 306$_1$ and its corresponding point in the corresponding point cloud 304$_1$. In this case, z values for the point cloud three-dimensional models 306$_1$ may be weighted for their actual distance to the corresponding point in the point cloud 304$_1$ such that the z values for the point cloud three-dimensional model 306$i$ which are closer to real measurements are attributed more weight.

In other non-limiting embodiments, weight may be attributed by minimizing residue between the point cloud three-dimensional model 306$_1$ and its respective point cloud 304$_1$. This may be done in the resolution optimization module 212 by computing the absolute value of the difference between each point of the point cloud 304$_1$ and the local value for the each point of the point cloud three-dimensional model 306$_1$ derived therefrom (i.e., after surface fitting to produce elementary surface elements). A sum of absolute values may then be computed for all points of the point cloud 304$_1$. The computation of the residue may be repeated for all relevant parameters of each point (e.g., the location, the color, the texture of the point and the likes) and the residues for each parameter of each point may be weighted according to the relative importance of the parameter in the point cloud three-dimensional model 306$_1$. A global residue value for one particular point cloud three-dimensional model 306$i$ may then be obtained. As a non-limiting example, and when the point cloud three-dimensional model 306$_1$ is only used for dimensional purposes, the computed residues for the parameters color and texture may be disregarded and the resolution optimization module 212 may accordingly attribute a weight of zero to these residues at each point. The global point cloud three-dimensional model 307 minimizing the residue may then be obtained by computing the average of each one of the point cloud three-dimensional models 306$_1$ weighted by the inverse of its corresponding residue value. This approach may also be applied to specific portions of the global point cloud three-dimensional model 307 independently of other portions.

Figure 4A:
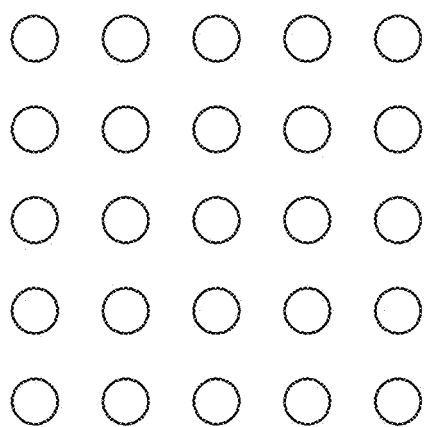
FIGS. 4A to 4F show examples of decimated (4B to 4E) and non-decimated (4A) point cloud three-dimensional models generated in accordance with a non-limiting embodiment of the invention—is also shown example of an improved global point cloud three dimensional derived from computing a weighted average of the decimated point cloud three-dimensional models above (4F)
Figure 4B:
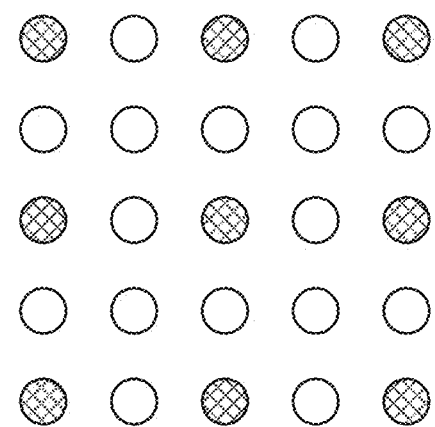
Figure 4C:
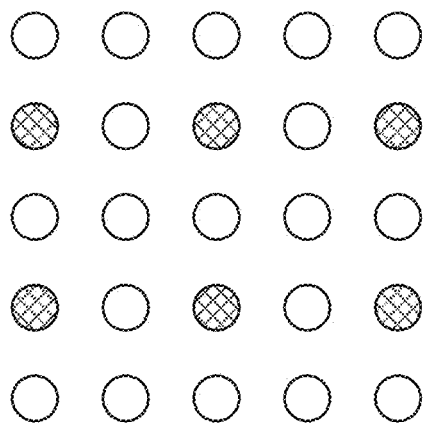
Figure 4D:
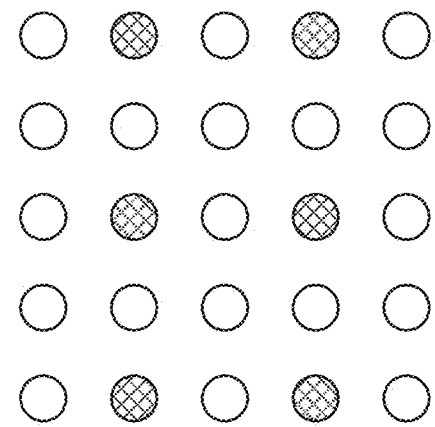
Figure 4E:
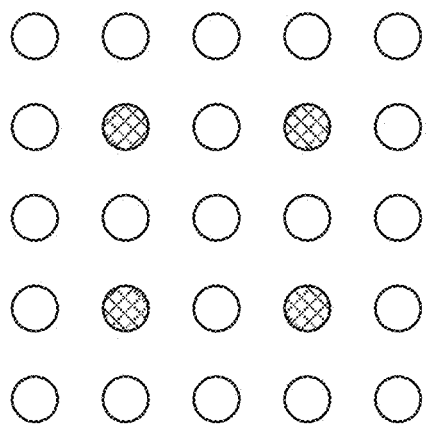
Figure 4F:
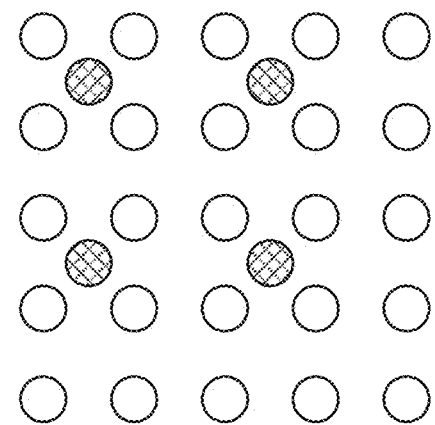

As a non-limiting example, a portion of one point cloud three-dimensional model 306$_1$ having 4 million acquired points in the point cloud 304$_1$ is shown in FIG. 4A. FIGS. 4B to 4E show various decimations of the point cloud 304$_1$ to reduce its total number of points by a factor of 4 (i.e., to 1 million acquired cloud points). Each one of these decimations may be used to generate different point cloud three-dimensional models 306$_1$ which are different from each other and different from the point cloud three-dimensional model 306$i$ generated from the point cloud 304$_1$ shown in FIG. 1A. By computing a weighted average of the point cloud three-dimensional models 306$_1$ as shown in FIGS. 4B to 4E, the values supplied by each one of the point cloud three-dimensional models 306$i$ shown in FIGS. 4B to 4E could be computed for the additional mid-points shown for the resulting global point cloud three-dimensional model 307 in FIG. 4F. These could be averaged to obtain a global point cloud three-dimensional model 307 that has 1 million acquired points and that at the same time captures the influence of all 4 million acquired points, instead of selecting one of the decimated point cloud three-dimensional models 306$_1$ as shown in FIGS. 4B to 4E that ignores 3 million of the acquired cloud points. Compared to using a single point cloud three-dimensional model 306$_1$ obtained by a single decimation of the point cloud 304$_1$, the resolution optimization module 212 may allow for the integration of dense resolution information captured in a plurality of decimated point cloud three-dimensional models 306$_1$ into a more manageable global point cloud three-dimensional model 307 of lesser resolution.

In another non-limiting embodiment, the processor 108 may execute in the resolution optimization module 212 a computer program for weighting a density of the point cloud 304$_1$ only around the useful portion(s) of the point cloud three-dimensional models 306*i* for specific applications. In one non-limiting embodiment, the useful portion(s) of the point cloud three-dimensional models 306$_1$ may comprise the visible portion(s) of the point cloud three-dimensional models 306$_1$. Only the useful points of the respective point cloud 304$_1$ may be kept (i.e., they may be weighted at 100% by the resolution optimization module 212) while the others may be discarded (i.e., they may be weighted at 0% by the resolution optimization module 212). More specifically, only one perspective may be used during display of the global point cloud three-dimensional model 307 by the processor 108 onto the display 118 such that all points of the global point cloud three-dimensional model 307 that are not shown in that particular perspective may be disregarded by the processor 108 by attributing a weight of 0% to the corresponding points of the point cloud 304$_1$. The resolution optimization module 212 may accordingly maximize the resolution of the global point cloud three-dimensional model 307 only in the visible perspective of the global point cloud three-dimensional model 307 while minimizing computing efforts by the processor 108.

In yet a further non-limiting embodiment, the processor 108 may execute in the resolution optimization module 212 a computer program for implementing a decimation of the point cloud 304$_1$ proportional to a zooming level onto the point cloud three-dimensional model 306$_1$. The resolution optimization module 212 may accordingly ensure that a displayed resolution of the point cloud three-dimensional model 306$_1$ is manageable by the processor 108 while varying the dimensional resolution of the point cloud three-dimensional model 306$_1$ by decimation, or preferably by computing a weighted average. By using this method, a same optimal number of points displayed by the processor 108 onto the display 118 may be kept constant irrespective of the zooming level onto the point cloud three-dimensional model 306$_1$, the optimal number of points being a compromise between processing load and apparent resolution onto the display 118. In yet further non-limiting embodiments, the real-life object and/or person 300 may be segmented into a plurality of adjacent point cloud three-dimensional models 306$_1$ that may each be weighted according to a zooming level as well as their presence and proximity to a portion of the point cloud three-dimensional model 306$_1$ being displayed on the display 118.

The processor 108 may further execute in the resolution optimization module 212 a computer program for performing continuity conditioning between the multiple adjacent point cloud three-dimensional models 306$_1$ to ensure colocation and optionally identical curvature along the junction between the adjacent point cloud three-dimensional models 306$_1$ (i.e., between adjacent elementary surface elements of two distinct three-dimensional models 306$_1$). The density of the point cloud 304$_1$ for each one of the plurality of adjacent point cloud three-dimensional models 306$_1$ may also vary according to their importance for the particular application (e.g., a particular point cloud three-dimensional model 306$_1$ not shown in a perspective displayed by the processor 108 onto the display 118 may be weighted at 0%). For example, a point cloud three-dimensional model 306$_1$ depicting a gearing mechanism may be focused exclusively on the teeth portions of the mechanism rather than on the rest of the mechanism if it is used for dimensional matching during the rotations. In this example, the resolution optimization module 212 may weight distinct adjacent point cloud three-dimensional models 306$_1$ of the various portions of the gearing mechanism such that the resolution of the global point cloud three-dimensional model 307 is maximized around the teeth and minimized in the central portions of the gearing mechanism.

In yet a further non-limiting embodiment, the processor 108 may execute in the resolution optimization module 212 a computer program for imposing a predefined motif onto the point cloud three-dimensional model 306$_1$ and match the pre-defined motif by minimizing the computed residue. Pre-knowledge of the real-life object and/or person 300 (i.e. dimensional knowledge of the real-life object and/or person 300 or other informational knowledge such as color, texture and the likes) may be used to select generic elementary surface elements with characteristics that may better match specific portions of the real-life object and/or person 300. In a non-limiting example, a plurality of generic elementary surface elements exhibiting motifs as found on human skin, lips, eyebrows, and the likes may be selected when the real-life object and/or person 300 is a human portrait. One point cloud three-dimensional model 306$_1$ may be generated for each one of these generic elementary surface elements and the processor 108 may then execute in the resolution optimization module 212 a computer program for computing the individual residue for each one of the point cloud three-dimensional models 306$_1$ and then select the type of generic elementary surface element minimalizing the computed residues. This may in turn help increase the apparent resolution of the global point cloud three-dimensional model 307 generated therefrom.

In yet a further non-limiting embodiment, the processor 108 may execute in the resolution optimization module 212 a computer program for implementing specific surface fitting methods according to pre-known conditions (e.g., dimensions, color, texture and the likes). As a non-limiting example, and according to the geometry of the real-life object and/or person 300, the resolution optimization module 212 may distinguish between sharp edges within the elementary resolution and smooth rounded angular transitions over a plurality of elementary surface elements. The continuity conditions most appropriate for each one of these cases may be different. For example, a continuity of location, slope and curvature along the ridges joining the elementary surface elements of the point cloud three-dimensional model 306$_1$ may be more appropriate for smooth transitions over multiple elementary surface elements, while a discontinuity condition may be more appropriate when a linear 90° sharp edge is expected to pass through several elementary surface elements of the point cloud three-dimensional model 306$_1$. In this non-limiting embodiment, the resolution optimization module 212 may identify the portions of the real-life object and/or person 300 containing the linear 90° sharp edges and generate corresponding point cloud three-dimensional models 306*i* assuming different trajectories of the linear ridge. The resolution optimization module 212 may then compute the residues between each point cloud three-dimensional models 306$_1$ and its corresponding point cloud 304$_1$ and then weight the point cloud three-dimensional models 306$_1$ by the inverse of their specific residue to obtain an averaged point cloud three-dimensional model 306$_1$ minimizing the residue. Using this approach, the linear ridge may be positioned inside an elementary surface element, which may increase the inherent mesh resolution (e.g., by adding extra mesh points in the area around the intersection between the ridge and the surface of the elementary surface element or by using an elementary surface element with a sharp demarcation along the ridge). Similar approaches may be applied for various expected discontinuities, such as but not limited to the object profile where there is a sharp edge in depth. The identification of elementary surface elements containing the linear 90° sharp edges by the resolution optimization module 212 may be facilitated by knowledge of the background behind the real-life object and/or person 300 or by placing the real-life object and/or person 300 within a volume of known background, preferably contrasting with the appearance of the real-life object and/or person 300. As a non-limiting example, a bi-dimensional image of a black cube onto a contrasted white background may exhibit black pixels where the cube is located, white pixels outside of the location of the cube and grey pixels along the sharp edges of the cube. The linear trajectories of the cube profile may be better defined by executing in the resolution optimization module 212 a computer program for performing a linear regression along the adjacent grey pixel lines.

In yet a further non-limiting embodiment, pre-knowledge of the real-life object and/or person 300 may be used to refine the resolution of the global point cloud three-dimensional model 307. Specifically, the processor 108 may execute in the resolution optimization module 212 a computer program for introducing predefined conditions to connect the elementary surface elements of the global point cloud three-dimensional model 307 (also called connection rules) and to ensure continuity each known portion of the real-life object and/or person 300 spreading over multiple elementary surface elements, thus increasing the apparent resolution of the global point-cloud three-dimensional model 307. For example, in a global point cloud three-dimensional model 307 of a terrain it may be expected to find water, forest, road(s), gravel, rocks, and the likes. These distinct portions of the global point cloud three-dimensional model 307 may impose specific characteristics not only for the elementary surface elements, but also for the continuity between these elementary surface elements. A road may be in a particular grey tone, may have a specific range of width, may comprise white continuous and dash lines at specific position ranges in regard to the width, may exhibit continuity along its path and in curvature, and the likes. The resolution optimization module 212 may in turn use these characteristics to generate a plurality of point cloud three-dimensional models $306_1$. The processor 108 may then execute in the resolution optimization module 212 a computer program for minimizing the individual residue for each one of the point cloud three-dimensional models $306_1$ to locate the aforementioned elements in the global point cloud three-dimensional model 307. In addition, once these elements are appropriately positioned in the global point cloud three-dimensional model 307, the characteristics of these elements may be used to refine the elementary resolution of the global point cloud three-dimensional model 307 (e.g., continuity of the white side line of road that may be applied within a unitary surface element and the likes).

It is appreciated that the processor 108 may execute in the resolution optimization module 212 anyone of the above computer programs in any sequence, any combination of the above computers programs as well as other computer programs in other embodiments. The resolution optimization module 212 may improve the resolution of the global point cloud three-dimensional model 307 while minimizing load on the processor 108, even with zooming functions.

Depth, Color and Texture

The avatar creation module 114 may also generate depth, color and texture information for the global point cloud three-dimensional model 307 in either one of the resolution optimization module 212 or the color and texture module 214.

In one non-limiting embodiment, the processor 108 may execute in the resolution optimization module 212 a computer program for computing a weighted average of a plurality of point cloud three-dimensional models $306_1$ obtained with sequences of structured illumination (e.g., projecting a known light pattern of grids or horizontal bars separated by shadow onto the real-life object and/or person 300, etc.). It is appreciated that such structured illumination forms patterns proportional to depth information onto the real-life object and/or person 300.

The synchronization/acquisition module 216 may control an illumination element 312 to project known light patterns onto the real-life object and/or person 300. The acquisition of series of bi-dimensional images $303_1$ by the image sensor 310 may be coordinated with the activation of the illumination element 312 via the synchronization/acquisition module 216 to ensure that at least two series of synchronized bi-dimensional images $303_1$, $303_2$ are recorded. In this non-limiting embodiment, the first series of bi-dimensional images $303_1$ may be directed to a first light pattern projected onto the real-life object and/or person 300 where "lines" of shadow which are equidistant and of identical thickness cover half of the bi-dimensional images, the interlines covering the other half of the bi-dimensional images being illuminated. The second series of bi-dimensional images $303_2$ may comprise images where the lines of shadow are shifted to cover the illuminated interlines of the first series of bi-dimensional images $303_1$, the lines of shadow of the first series of bi-dimensional images $303_1$ being illuminated. The synchronization/acquisition module 216 may then generate at least two point cloud three-dimensional models $306_1$, $306_3$ based on each one of the two recorded series of bi-dimensional images $303_1$, $303_2$. From these two series, the resolution optimization module 211 may generate depth as well as color and texture by weighting the portion of the point cloud three-dimensional models $306_1$ under shadow at 100% for depth information and at 0% for color and structure, while weighting the portion of the point cloud three-dimensional models $306_1$ under normal illumination at 0% for depth information and at 100% for color and structure.

Figure 5:
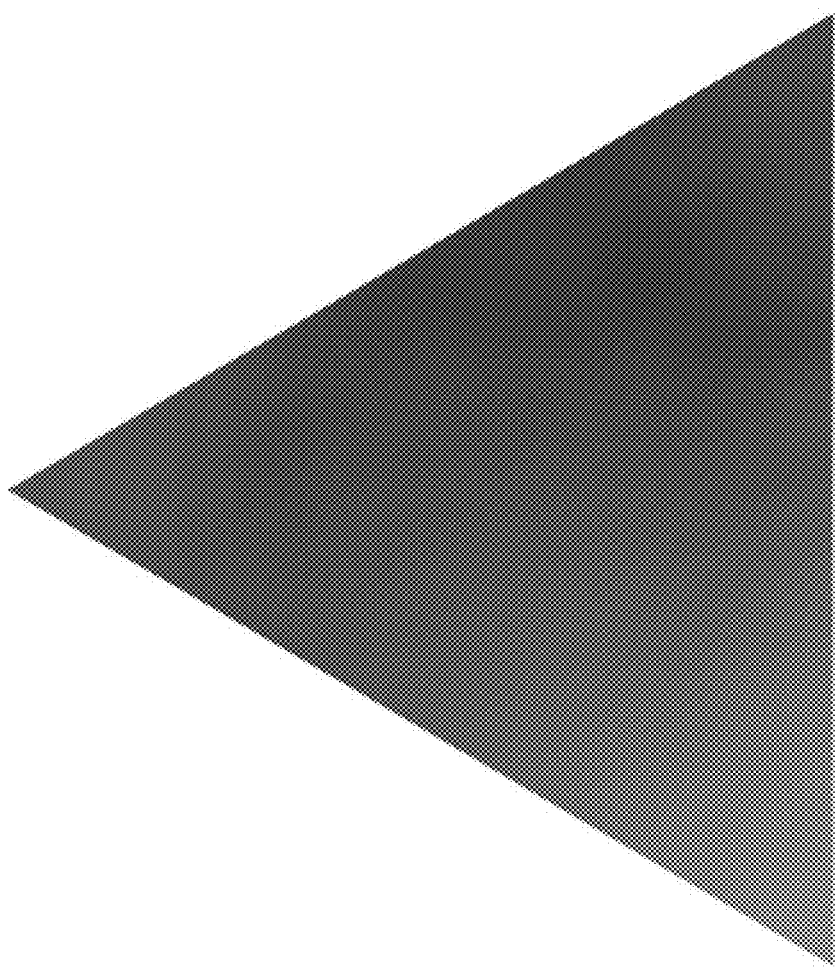
FIG. 5 shows an elementary surface element of a point cloud three-dimensional model having a linear gradation of color in accordance with a non-limiting embodiment of the invention.
Figure 5:
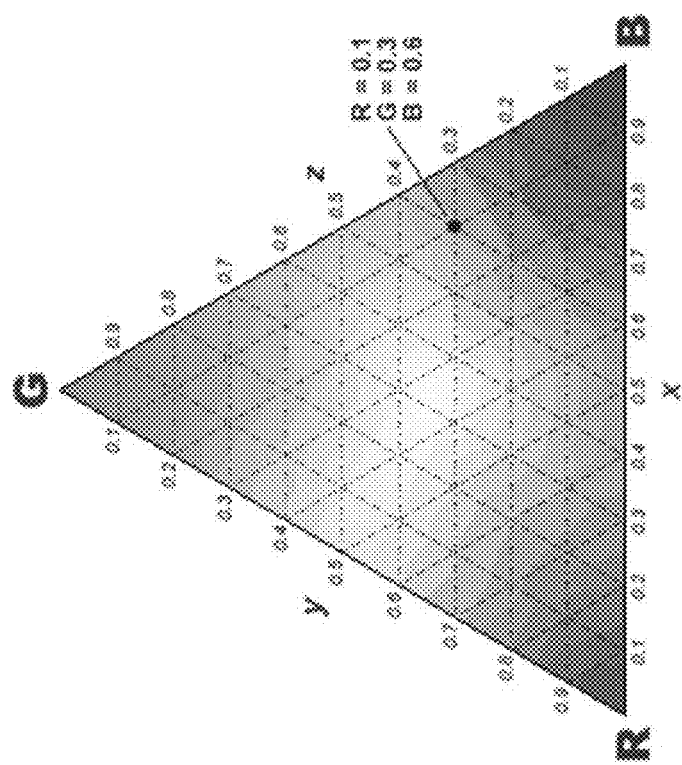

In another non-limiting embodiment, the processor 108 may execute in the color and texture module 214 a computer program to grade a color and a texture of the elementary surface elements of the point cloud three-dimensional model $306_1$ between the respective values for color and texture at each one of the corresponding cloud points. In a non-limiting example, and with further reference to FIG. 5, a linear graded surface color for a triangular elementary surface element is shown with one red, one green and one blue cloud point. A level for color at each one of the mesh points within the elementary surface element may be proportional to its distance from that meshing point in the triangular element and the color at each mesh point location is computed by measuring the sum of the three prorated mesh point colors. In this non-limiting example with pure red, green and blue mesh points, a pixel of (x, y, z) RGB value similar to the protocols used in numerical screen coloring may be obtained for each internal mesh point location. The computer program above may also be used with mesh points of any RGB value and with various elementary surface element shapes by summing their weighted values to account for adimensional distance from each mesh point. Non-linear functions may also be used, such as quadratic or cubic splines functions, especially when the bi-dimensional images of the real-life object and/or person 300 acquired by the synchronization/acquisition module have a greater resolution than the resolution of the mesh of the point cloud three-dimensional model $306_1$.

In yet a further non-limiting embodiment, the processor 108 may execute in the color and texture module 214 a computer program to improve the color and texture fidelity of the global point cloud three-dimensional model 307 based on a computed weighted average of the point cloud three-dimensional models $306_1$ obtained under different illumination conditions. Specifically, in a non-limiting example, the color and texture module 214 may use the series of bi-dimensional images $303_1$ acquired under different illumination angles to vary the location of shadows and then compare region per region of the real-life object and/or person 300 the sequential point cloud three-dimensional models $306_1$ obtained under these different illumination angles. The darker contributor may be weighted at 0% by the color and texture module 214 to remove shadows from the global point cloud three-dimensional model 307. Similarly, a vectorial brightness of individual elementary surface elements may be determined by varying the illumination angle, the vectorial brightness corresponding to the amount of light reflected according to the angle of incidence of the light onto the surface. The color and texture module 214 may also generate an improved global point cloud three-dimensional model 307 by using series of bi-dimensional images $303_1$ acquired under different color illumination. As a non-limiting example, the real-life object and/or person 300 may be fully flooded from all directions with pure component of RGB at a same intensity and successively, the RGB color values of the global point cloud three-dimensional model 307 may be weighted to only consider the corresponding color illumination, while the rest of the global point cloud three-dimensional model 307 parameters (e.g., various (x, y, z) locations) may be obtained by averaging the individual point cloud three-dimensional models $306_1$ for each illumination condition.

It is appreciated that the processor 108 may execute in the resolution optimization module 212 and/or in the color and texture module 214 anyone of the above computer programs in any sequence, any combination of the above computers programs as well as other computer programs in other embodiments. These resolution improvements in turn enable the generation of a global point cloud three-dimensional model 307 manageable by the computer unit 102 and processor 108 with improved visualization even with zooming functions.

Synchronization

Synchronized series of bi-dimensional images $303_1$ may be obtained by acquiring the series simultaneously or in sequence much faster than any perceivable movement, deformation or lightening of the real-life object and/or person 300. For an inanimate, fixed real-life object and/or person 300 under constant control lightening, synchronized data may be acquired via laser and other multi-seconds scanning acquisition methods. For animated real-life object and/or person 300, and with the advance in high speed burst mode still and video cameras, synchronized data may be acquired using commercially-available cameras with up to 1,000 frames per second (fps) at 3 megapixels (or 3 million points) or higher. These cameras may capture series of images in fractions of seconds and accordingly within a timeframe much faster than most movements.

In one non-limiting embodiment, the processor 108 may execute in the synchronization/acquisition module 216 a computer program for acquiring, in combination with the image sensor 310, series of bi-dimensional images $303_1$ without any significant motion or movement of the real-life object and/or person 300 between individual images. These series are referred to as "synchronized". Where synchronized series of bi-dimensional images $303_1$ are acquired at different known and constant perspectives covering the whole volumetric view of the real-life object and/or person 300, a plurality of point cloud three-dimensional models $306_1$ corresponding to each one of the synchronized series of bi-dimensional images $303_1$ may be generated. The synchronization/acquisition module 216 may then compute a weighted average of the sum of the point cloud three-dimensional models $306_1$ to derive a global point cloud three-dimensional model 307 that minimizes the influence of individual image errors and aberrations.

In another non-limiting embodiment, instantaneously synchronized images of the real-life object and/or person 300 at different known and constant perspectives covering the whole volumetric view of the real-life object and/or person 300 may be obtained by positioning a plurality of cameras 311 around the real-life object and/or person 300 at known positions and perspectives, the cameras 311 being configured for simultaneously acquiring images by the synchronization/acquisition module 216. In other non-limiting embodiments, a plurality of reflective surfaces such as mirrors may be used to create a plurality of angular paths between a single camera 311 and the real-life object and/or person 300 to create a plurality of perspectives, the camera 311 being notably configured to acquire "virtual" images of the real-life object and/or person 300 as reflected in the plurality of mirrors. The virtual image(s) may then be geometrically repositioned around the real-life object and/or person 300 by using the position and/or angle of the camera 311, of the real-life object and/or person 300 and of the plurality of reflective surfaces in the view path.

In yet a further non-limiting embodiment, a plurality of reflective surfaces such as mirrors may be used to redirect lightning onto the real-life object and/or person 300 with distinct perspectives, angles and distances. The reflective surfaces may be used to regroup spatially a plurality of cameras 311 and lightning elements 312. Specifically, each camera 311, or illumination element 312, may be directed at a specific mirror path so as to cover the full volume of the real-life object and/or person 300. In yet further non-limiting embodiments, the mirror path may occupy only a portion of the acquired image or redirect only a portion of the light emitted by the illumination element 312. It is appreciated that mirror paths may be fixed or flexible by controlling the angle of at least one mirror in the mirror path to point to an alternative mirror path or perspective. The mirrors may be convex, concave or may contain multi-angled facets to enlarge, focus or manipulate the perspective. Other optical elements may also be placed along the mirror path to manipulate the light creating the image or illuminate the real-life object and/or person 300, such as, but not limited to, lenses, polarization, collimating and other filtering devices and the likes. In some non-limiting embodiments, weight factors used in computing a weighted average for specific parameters of the point cloud three-dimensional model $306_1$ may be a function of specificities of mirrors and/or other optical elements along the mirror path.

In yet a further non-limiting embodiment, illumination of the real-life object and/or person 300 may be modulated during the acquisition of the series of bi-dimensional images $303_1$ by the synchronization/acquisition module 216 to instantaneously put an emphasis on specific parameters of the global point cloud three-dimensional model 307 which would accordingly be weighted more than others in the proposed averaging method. As described above, illumination of the real-life object and/or person 300 may be used to eliminate shadows, color and vectorial brightness. It may also be used to obtain information relating to a relative position of specific elements via the location of the shadows and the angle of the illumination. Structured illumination may also be used to improve depth definition. Markers reference may also be used to take into account small movements or deformations during the acquisition of the series of bi-dimensional images $303_1$ by the synchronization/acquisition module 216 by translating and rotating each individual point cloud three-dimensional model $306_1$ to a common reference position before computing the weighted average so as to obtain an improved global point cloud three-dimensional 307. The markers may be visual "add-on" elements added onto real-life object and/or person 300, projected reference points in the space under observation, invariant elements of the subject or any combination of the above. The markers may also be in the viewable surrounding of the real-life object and/or person 300 and may be integrated directly into the point cloud three-dimensional models $306_1$ as known fixed locations against which the point cloud three-dimensional models $306_1$ may be translated and/or rotated to be repositioned to a same reference orientation.

It is appreciated that the processor 108 may execute in the synchronization/acquisition module 216 anyone of the above computer programs in any sequence, any combination of the above computers programs as well as other computer programs in other embodiments. Computing the weighted average over a plurality of synchronized series of bi-dimensional images $303_1$ enables the virtual object creation system 100 to minimize the effects of acquisition errors and aberrations. The synchronization/acquisition module 216 may also vary the illumination of the real-life object and/or person 300 to improve specific individual parameters of the global point cloud three-dimensional model 307 while ensuring that the global point cloud three-dimensional model 307 is efficiently manageable by the processor 108 for display onto the display 118.

Stitching

The stitching module 218 may identify and overlap individual points of the point cloud three-dimensional model $306_1$ in at least two distinct series of bi-dimensional images $303_1$. The stitching module 218 may have an impact on the quality of the global point cloud three-dimensional model 307, that is on both the resolution of the global point cloud three-dimensional model 307 and the correspondence between the position, color and texture of points of the global point cloud three-dimensional model 307 with the corresponding points acquired in the series of bi-dimensional images $303_1$.

In one non-limiting embodiment, the processor 108 may execute in the stitching module 218 a computer program for assembling a plurality of series of dimensional images $303_1$ acquired by the synchronization/acquisition module 216 under different perspectives and covering the entire volume of real-life object and/or person 300 so as to create the point cloud three-dimensional models $306_1$. It is appreciated that while each mesh point of the point cloud three-dimensional model $306k$ has unique coordinates (x, y, z), each mesh point may also appear in at least two distinct series of bi-dimensional images $303_1$ acquired from different and known perspectives by the synchronization/acquisition module 216. A bi-dimensional image at a x-axis perpendicular perspective may acquire the (y, z) coordinates of the viewed points, a bi-dimensional image at a y-axis perpendicular perspective may acquire the (x, z) coordinates of the viewed points and a bi-dimensional image at a z-axis perpendicular perspective may acquire the (x, y) coordinates of the viewed points. Accordingly, and where one point of the point cloud $304_1$ is captured by at least two of the above bi-dimensional images, the three coordinates (x, y, z) are known. It is appreciated that this is applicable not only to axially perpendicular viewing angles but to any viewing angle by applying trigonometrical components of the three-dimensional perpendicular reference axis.

Several computer programs may be executed in the stitching module 218 using a plurality of series of synchronized bi-dimensional images $303_1$ such as, but not limited to, spherical translation of line of points to the adjacent viewed angle bi-dimensional image and deformation correlation to new set of coordinates, perpendicular bi-dimensional images point to point correspondence, and the likes.

In some non-limiting embodiments, viewed reference objects on or in the surrounding of the real-life object and/or person 300 may be used as starting points for correspondence between two series of bi-dimensional images $303_1$, the correspondence being then applied to the points adjacent the starting points. The background may also be graded to facilitate not only the identification of a silhouette of the real-life object and/or person 300 (i.e., the outline of the real-life object and/or person 300), but also its viewing angle. More specifically, and in one non-limiting example, an individual "edge" point on the silhouette of the real-life object and/or person 300 may be along a straight line from a position of the camera to the particular first visible graduation of the background. If an individual point is found on the silhouette of the real-life object and/or person 300 in two distinct bi-dimensional images acquired with camera(s) at different perspectives, the point may be at the crossing location between two straight lines joining the respective two positions of the camera(s) and the first visible graduation of the background. The two straight lines may extend to two different graduations of the background which may vary according to the position of the point on the silhouette of the real-life object and/or person 300. The processor 108 may execute in the stitching module 218 a computer program for deriving the position of the point on the silhouette of the real-life object and/or person 300 based on the positions of the camera(s) and the above-identified graduations of the background.

In other non-limiting embodiments, the processor 108 may execute in the stitching module 218 a computer program for first applying the elementary surface elements onto a first bi-dimensional image and then tilting the elementary surface elements so as to minimize the residue when compared with a second adjacent bi-dimensional image with a different viewing angle and to which the elementary surface elements have also been applied. This may be repeated by the processor 108 for all bi-dimensional images acquired by the synchronization/acquisition module 216. It is appreciated that the more detailed the elementary surface elements applied are, the more efficient on computer resources the execution of the computer program is. The deformation algorithm may also be weighted to put more emphasis on specific pre-knowledge of the real-life object and/or person 300, and/or on profile elements of the contour of the real-life object and/or person 300 matching. The computer program above may also take into account a disappearance of certain elementary surface elements in an adjacent bi-dimensional image with a different viewing angle due to shadowing effect of elementary surface elements that are "closer" from the illumination element 312 in the new perspective (e.g., where some elementary surface elements disappear because they are underneath other elementary surface elements and/or darker due to shadow resulting from the illumination).

Given that the computer programs executed by the stitching module 218 rely on point to point correspondence between at least two bi-dimensional images, the more differentiable the reference matching portions of the real-life object and/or person 300 are from the rest of the bi-dimensional images acquired (i.e., in terms of shape/dimension, color, texture and the likes), the more efficient the point to point correspondence may be. Conversely, the less differentiable each portion of the real-life object and/or person 300 is, the more difficult it may be to distinguish the overlapping portion in the different views of the real-life object and/or person 300. As a non-limiting example, bi-dimensional images acquired of a sphere having a uniform color and brightness would be identical from any perspective. One approach to overcome this similarity, or lack of differentiability, may be to project a light pattern, or structured light, onto the uniform object to differentiate its portion. A rapid sequence of differentiated patterns may be projected onto the sphere, the sequence being synchronized by the synchronization/acquisition module 216 with the acquisition by the image sensor 310 to obtain a series of point cloud three-dimensional models $306_1$. The global point cloud three-dimensional model 307 may then be obtained by computing the weighted average of the individual point cloud three-dimensional models $306_1$ and attributing a higher weight to the "patterned" point cloud three-dimensional models $306_1$ to obtain spatial point coordinates and a higher weight to the non-patterned uniform point cloud three-dimensional models $306_1$ to obtain color and texture information.

It is appreciated that the processor 108 may execute in the stitching module 218 anyone of the above computer programs in any sequence, any combination of the above computers programs as well as other computer programs in other embodiments.

Depth

In other non-limiting embodiments, depth information may be obtained by projecting onto the real-life object and/or person 300 structured light at a wavelength other than the visible range. A plurality of image sensors 310 may used, some of the image sensors 310 capturing color and texture information while some other image sensors 310 may be sensible to the non-visible wavelength range chosen. Depth information may be obtained directly via the synchronization/acquisition module 216 and/or by the depth module 220.

In one non-limiting embodiment, the processor 108 may execute in the synchronization/acquisition module 216 a computer program for projecting sequentially natural and an infrared light pattern onto real-life object and/or person 300, such as crosses centered in circles. The synchronization/acquisition module 216 may acquire both infrared information data and color and texture information using a plurality of image sensors 310. In this non-limiting example, the plurality of image sensors 310 may comprise at least infrared cameras and cameras operable in the visible spectrum. At least two point cloud three-dimensional models $306_1$ may be generated; one based on the information acquired by the image sensor(s) 310 in the visible spectrum, the second based on other on the information acquired by the image sensor(s) 310 in the infrared spectrum. Depth information for the global point cloud three-dimensional model 307 may be obtained by computing a weighted average between the two point cloud three-dimensional models $306_1$ and attributing more weight to the point cloud three-dimensional model $306_1$ generated from the information acquired in the infrared spectrum. In parallel, color and texture information for the global point cloud three-dimensional model 307 may be obtained by computing a weighted average between the two point cloud three-dimensional models $306_1$ and attributing more weight to the point cloud three-dimensional model $306_1$ generated from the information acquired in the visible spectrum.

It is appreciated that the projected pattern of a cross centered in a circle may be collimated or not collimated. For collimated projections, the circle may deform according to the depth angle of the subject plane hit. If the plane is perpendicular to the projection axis, the circle may be perfectly round. Conversely, if the plane has a depth angle to the projection axis, an ellipse may be formed at its surface with an axis ratio proportional to that angle and quadrant ratios defined by the central cross may be proportional to the angle orientation. For non-collimated projections, usually divergent, the pattern dimension will usually increase with the absolute distance of the subject plane it hits from the projection device, so the pattern deformation will be the result of both absolute distance and target subject plane angle, a second projection hitting the same surface but from a different location can then be used to discriminate between the absolute distance and target subject plane angle deformation effects. Any other pattern, collimated or not, may be projected onto the real-life object and/or person 300 to extract depth information in other embodiments.

In another non-limiting embodiment, shadows created by light projected from a known orientation and location onto the real-life object and/or person 300 may be used to determine sequences of depth of various successive portions of the real-life object and/or person 300 in the series of bi-dimensional images $303_1$ acquired, the lighted portions being in front of the shadowed portions along each projection orientation of illumination. Various illumination elements 312 positioned at different locations around the real-life object and/or person 300 may be controlled by the synchronization/acquisition module 216 to simultaneously illuminate the real-life object and/or person 300, thereby creating various overlapping shadows. This approach may be used to analyze simultaneously shadows created from various orientations. As a non-limiting example, a yellow illumination may be projected onto the real-life object and/or person 300 and a blue illumination may be simultaneously projected to the yellow illumination. The surfaces of the real-life object and/or person 300 perpendicular to the yellow illumination axis may appear in pure yellow, while the surfaces of the real-life object and/or person 300 perpendicular to the blue illumination axis may appear in pure blue. The surfaces of the real-life object and/or person 300 at an angle with the two illumination axes (i.e., the surfaces that are not perpendicular to both the yellow and blue illumination axes) may exhibit varying degrees of green with portions of yellow and blue proportional to the respective angle with the yellow and blue illumination axes. The depth module 220 may then generate a point cloud three-dimensional model $306_1$ according to the identified angles of each individual surface of the real-life object and/or person 300 relative to the yellow and blue illumination axes. A third axis may be added using another color illumination, such as red or any other color.

In other non-limiting embodiments, depth information acquired in the synchronization/acquisition module 216 via the projection of known light patterns onto the real-life object and/or person 300 may be improved by using the projection of known color light patterns. Specifically, adjacent thin lines of distinct colors (the lines being thinner than the lines of shades and light disclosed above) may be used to refine the depth generated while reducing the errors due to similarity of color in adjacent parts of the real-life object and/or person 300.

In other non-limiting embodiments, the synchronization/acquisition module 216 may also project color lines onto the real-life object and/or person 300 perpendicularly to form a grid of various tinted squares. The three-dimensional space around the real-life object and/or person 300 may also be divided by the synchronization/acquisition module 216 into color coded cubes where the tints reflected by the various portions of the real-life object and/or person 300 may represent spatial coordinates and facets orientation.

In yet a further non-limiting embodiment, the processor 108 may execute in the depth module 220 a computer program for using reference graduated objects positioned at known locations in the view planes of the real-life object and/or person 300. These reference graduated objects may be used by the depth module 220 to derive relative positions and dimensions of not only the entire real-life object and/or person 300 but also of the respective portions of the real-life object and/or person 300 by trigonometry triangulation. As a non-limiting example, a reference cube of known dimensions may be positioned at a center of a table such that relative dimensions of other visible objects positioned on the table may be assessed in each bi-dimensional image. The relative dimensions obtained from all perspectives may then be combined by the depth module 220 to obtain relative distance from the reference cube maintaining constant absolute dimensions for each other object positioned on the table.

Figure 6:
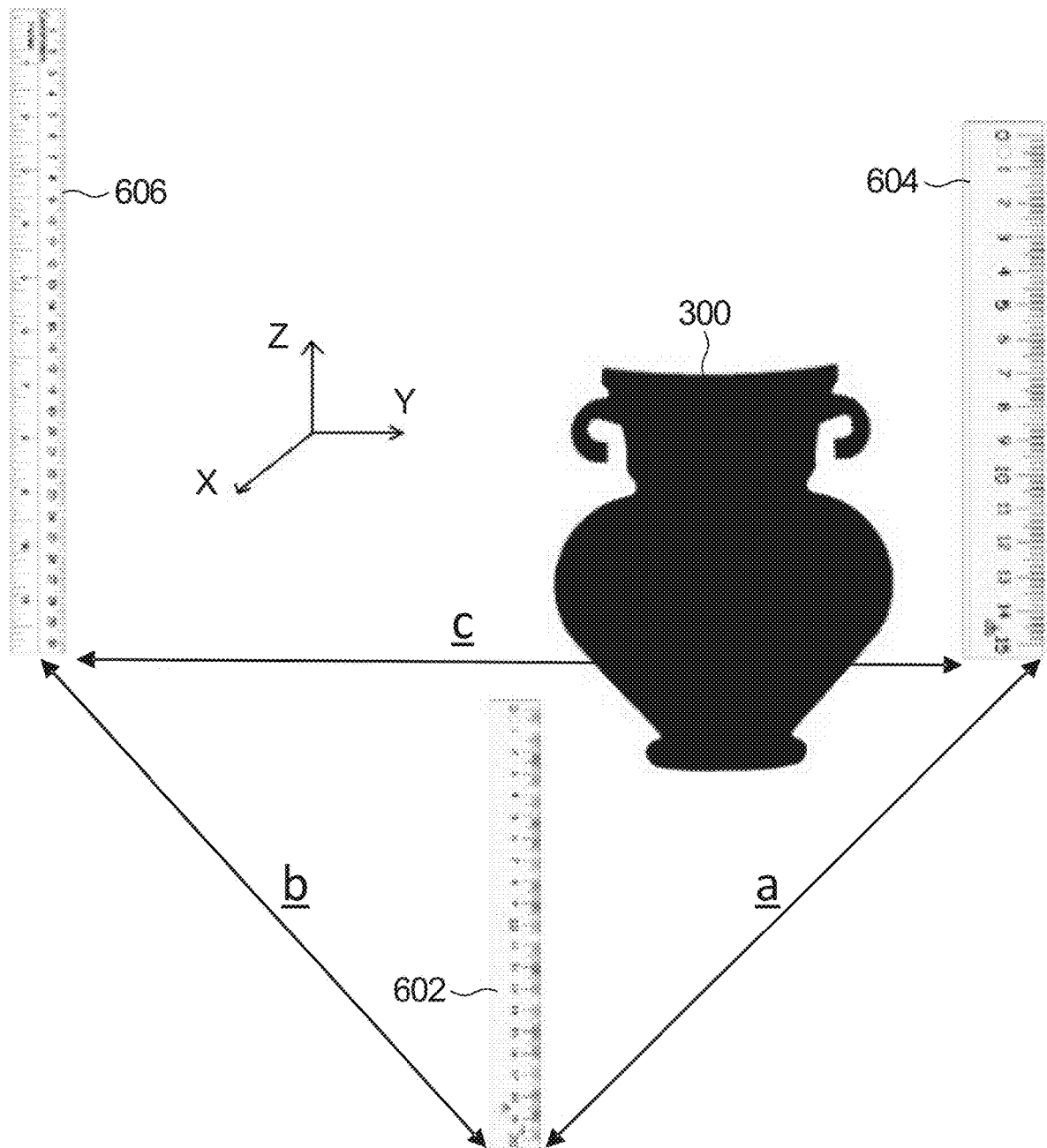
FIG. 6 shows the use of graduated references to position and dimension an object in accordance with a non-limiting embodiment of the invention.

An approach using graduated backgrounds has been described above, but similar trigonometry triangulation may be applied using graduated references within the scanned volume. With further reference to FIG. 6, the real-life object and/or person 300 may be positioned within three graduated references 602, 604 and 608 (in this example, three rulers), each one of the three references having a known location (in the (x, y) plane) as well as a known height (along the z axis). The relative distance between the graduated references 602, 604 and 608 (i.e., a, b and c) as well as height ratios between the graduated references 602, 604 and 608 may in turn be used by the depth module 220 to establish a perspective of bi-dimensional images and its floor plane graduation (i.e., perspective graduation of the floor plane in each bi-dimensional image), and thus calculate the position of the real-life object and/or person 300. The perspective height ratios may then be used to establish the height of the real-life object and/or person 300. By using different perspectives rotating around the real-life object and/or person 300, the real-life object and/or person 300 may be virtually reconstituted.

It is appreciated that the processor 108 may also execute in the depth module 220 anyone of the above computer programs in any sequence, any combination of the above computers programs as well as other computer programs in other embodiments. Depth resolution improvements enable to generate manageable global three-dimensional models 307 that are more realistic from any viewing perspective.

Extrapolation and Intrapolation

Figure 7:
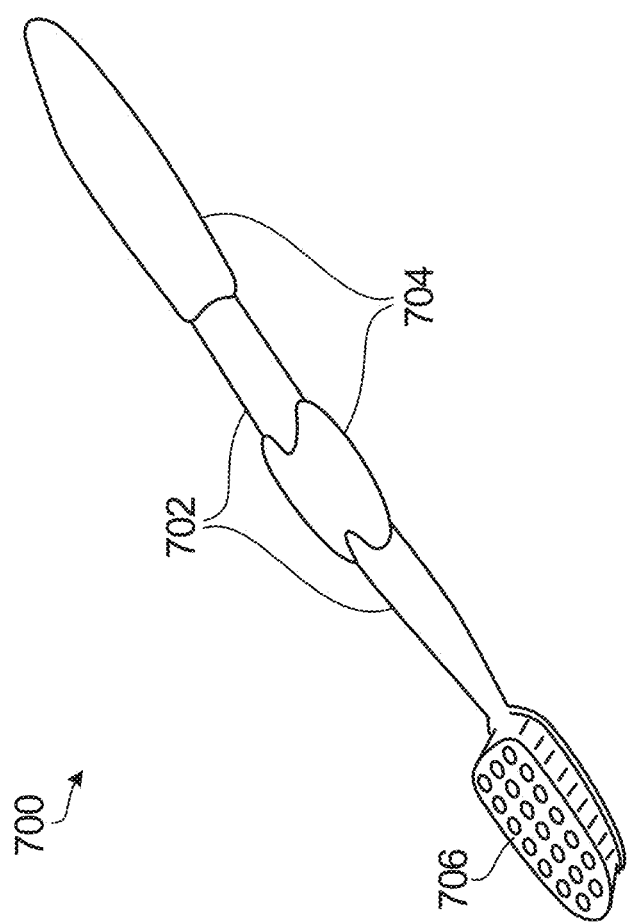
FIG. 7 shows the use of pre-known information about an object to select elementary surface elements with specific properties for specific portions of the object in accordance with a non-limiting embodiment of the present invention.

In some non-limiting embodiments, the processor 108 may execute in the extrapolation and intrapolation module 222 a computer program for using pre-knowledge information about the real-life object and/or person 300 to select between pre-defined elementary elements corresponding to potential sub-portions of the real-life object and/or person 300. With further reference to FIG. 7, a toothbrush is shown having the following associated pre-knowledge information: plastic handle elements 702, rubber grip elements 704 and brush air elements 706. Each one of the above elements may exhibit specific, pre-known, parameter characteristics, such as brightness, texture and scalable motifs. Three distinct point cloud three-dimensional models $306_1$ may be generated using each one of the specific type of elements. Local residues may then be computer for each surface element compared to the acquired point clouds $304_1$. The global point cloud three-dimensional model 307 may then generated using for each local surface element, the type with minimal residue.

In other non-limiting embodiments, the processor 108 may execute in the extrapolation and intrapolation module 222 a computer program for improving a realism of the global point cloud three-dimensional model 307 (i.e., the apparent resolution of the model, color and textures, as well as components not acquired or poorly acquired during acquisition by the synchronization/acquisition module 216). More specifically and where certain portions of the real-life object and/or person 300 may remain in shades due to the illumination conditions during image acquisition by the synchronization/acquisition module 216, intrapolation programs may be executed by the processor 108 in the extrapolation and intrapolation module 222 between the color and texture of neighbouring unshaded portions of the real-life object and/or person 300. In other non-limiting embodiments, the extrapolation and intrapolation module 222 may extrapolate successively color and texture information from neighbouring unshaded portions of the real-life object and/or person 300 to generate a series of point cloud three-dimensional models $306_1$ and then apply a virtual illumination similar to the illumination of the real-life object and/or person 300 during data acquisition by the synchronization/acquisition module 216. This virtual illumination may in turn help to reproduce virtual aspects of the portion in shadows. Each one of the extrapolated point cloud three-dimensional models $306_1$ may then be compared to the acquired data (i.e., to the point clouds $304_1$) and residue minimization algorithms may then be used to identify the best fit for each individual shaded elementary surface element to generate the global point cloud three-dimensional model 307.

Figure 8:
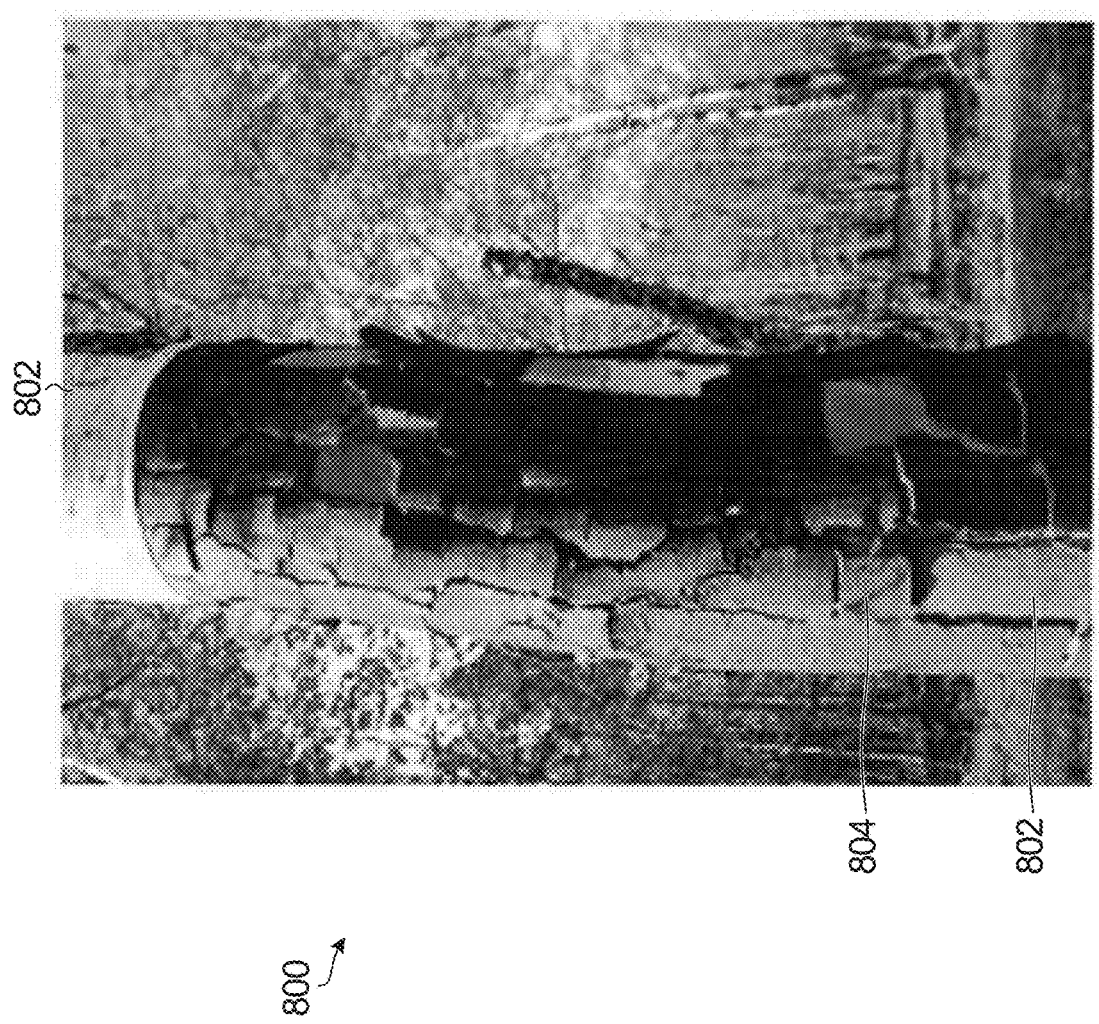
FIG. 8 shows a real-life object suited for generating overlapping layered point cloud three-dimensional models in accordance with a non-limiting embodiment of the present invention.

In other non-limiting embodiments, the processor 108 may execute in the extrapolation and intrapolation module 222 a computer program for layering and extrapolation of obscured views (i.e., view not apparent in any of the acquired bi-dimensional images but that exist based on pre-knowledge of the real-life object and/or person 300). With further reference to FIG. 8, a birch trunk 800 is shown which is constituted of overlapping and delaminating layers of white bark 802, dry brown bark 804 and base beige wood trunk 806. Based on this bi-dimensional image, the extrapolation and intrapolation module 222 may generate overlapping layered point cloud three-dimensional models $306_1$ where the individual layers shown in FIG. 8 each correspond to a point cloud three-dimensional model $306_1$ with both visible portions and invisible portions, the invisible portion being extrapolated by the extrapolation and intrapolation module 222 based on the bi-dimensional image acquired. The deepest visible internal layer in FIG. 8 (i.e., the wood trunk) may be extrapolated even under portions covered by other visible layers (i.e., the white and dry brown bark) to generate a first point cloud three-dimensional model $306_1$ of the beige wood trunk. A second point cloud three-dimensional model $306_1$ may then be generated over the first by using the acquired data from the second layer (i.e., the dry brown bark) and it is extrapolated under overlapping layers. A third point cloud three-dimensional model $306_1$ may be generated from the top layer's data (i.e., the white bark). The global point cloud three-dimensional model 307 may then be derived by retaining only exposed portions of each one of the point cloud three-dimensional models $306_1$ representing the individual layers. This may be particularly useful where the real-life object and/or person 300 has shaded or obscured portions. In other non-limiting embodiments, the real-life object and/or person 300 may be segmented by the extrapolation and intrapolation module 222 into a plurality of point cloud three-dimensional models $306_1$ stacked on top of each other. For example, a plurality of point cloud three-dimensional models $306_1$ may be generated for each individual component of a piece of furniture, using extrapolation to complete the obscured portion(s) of each one of the point cloud three-dimensional models $306_1$. The extrapolation and intrapolation module 222 may then use a steric algorithm to position each one of the point cloud three-dimensional models $306_1$ relative to each other by minimizing the computed residue when compared to the acquired data (i.e., the point cloud $304_1$) from the various perspectives. Non-limiting examples of steric rules include: separate components must occupy distinct spatial volumes, the base of the head component much be attached to the top of the torso component, and the likes.

In other non-limiting embodiments, and where the real-life object and/or person 300 may be composed of a plurality of volumes with different known densities, a scale may be positioned on the surface where the real-life object and/or person 300 rests to measure the weight of the real-life object and/or person 300. After the global point cloud three-dimensional model 307 has been generated, a specific density may be applied to each individual point cloud three-dimensional model $306_1$ (i.e., each volume) to calculate their respective weight. A sum of these weights may then be computed and a correspondence between the weight of the real-life object and/or person 300 and the computed weight may be validated. The difference may be used to further refine the specific volumes of the global point cloud three-dimensional model 307 proportionally to the specific level of incertitude determined by the quality of their specific acquired data (i.e., resolution, number of stitching points and the likes). This approach may be refined when acquisition of visual information by the synchronization/acquisition module 216 is combined with density distribution scanning techniques, such as but not limited to ultrasound sonar survey.

It is appreciated that the processor 108 may execute in the extrapolation and intrapolation module 222 anyone of the above computer programs in any sequence, any combination of the above computers programs as well as other computer programs in other embodiments. The extrapolation and interpolation algorithms may be particularly useful to compensate for poorly lighted portions of the real-life object and/or person 300 in the global point cloud three-dimensional model 307.

Avatar Creation

Where the real-life object and/or person 300 is the body of an individual, the virtual object creation system 100 may be used to create a global point cloud three-dimensional model 307 called an avatar. The avatar may preferably exhibit a more detailed head representation, in particular facial representation, while a silhouette may be coarser due to clothes. As a result, and in the specific context of avatar creation, the global point cloud three-dimensional model 307 may preferably exhibit a higher mesh resolution in the facial area over the remaining areas (e.g., the silhouette). The virtual object creation system 100 may advantageously distribute in the resolution optimization module 212 the mesh resolution between different portions of the global point cloud three-dimensional model 307 according to the relative importance of said portions by computing a weighted average. In other non-limiting embodiments, other portions of the global point cloud three-dimensional model 307 may be considered more important and the mesh resolution of the global point cloud three-dimensional model 307 may be distributed accordingly by computing a distinct weighted average to generate the global point cloud three-dimensional model 307.

With pre-knowledge of the body of the individual, several strategies may further be implemented to improve the global point cloud three-dimensional model 307. Specific types of elementary surface elements may be used to connect the various points of the point cloud $304_1$ which, based on the pre-knowledge of the real-life object and/or person 300, may be known to correspond to hair, skin, lip, eye, nail, clothing, accessories portions and/or sub-portions and the likes. These specific types of elementary surface elements may exhibit specific characteristics in terms, for example, of textures and/or motifs and the likes. These types of elementary surface elements may also be scalable to match the actual dimensions of the series of bi-dimensional images $303_1$ acquired by the synchronization/acquisition module 216 bi-dimensional images dimensions and may also enable zooming functions in the resolution optimization module 212. As a non-limiting example, an elementary surface element for a hair portion may comprise a plurality of cylinders having substantially equal diameter, the cylinders traversing a plane of the elementary surface element and being generally stacked in a parallel orientation perpendicular to the plane of the elementary surface element. Parameters such as hair color or texture may be unspecified in the elementary surface element but subsequently adjusted to match series of bi-dimensional images $303_1$ acquired. The virtual object creation system 100 may accordingly be used to identify for each elementary surface element which specific type of elementary surface element minimizes the computed residue between the point cloud three-dimensional model $306_1$ and the point cloud $304_1$.

The global point cloud three-dimensional model 307 may also be divided into pre-known portions, such as a head, a torso, a right arm, a left arm, a right leg, a left leg portion and the likes. Point cloud three-dimensional models $306_1$ may be generated for each one of above portions using the specific characteristics of the pre-known portions to optimize them (e.g., minimize the computed residue). The point cloud three-dimensional models $306_1$ may then be joined together according to specific steric rules to generate the global point cloud three-dimensional model 307. Non-limiting examples of steric rules include: separate portions must occupy distinct spatial volumes, the base of the head portion much be attached to the top of the torso portion, and the likes.

A plurality of levels of pre-known portions may be used to generate the global point cloud three-dimensional model 307. As a non-limiting example, an arm portion may be subdivided into a shoulder, an upper arm, an elbow, a forearm, a wrist, a palm, a thumb and four fingers sub-portions. A point cloud three-dimensional model $306_1$ may be generated for each one of the above sub-portions, these point cloud three-dimensional models $306_1$ being subsequently assembled according to specific steric rules to generate the point cloud three-dimensional model $306_1$ of the arm portion. The global point cloud three-dimensional model 307 for the avatar may accordingly be assembled using various levels of pre-known portions each assembled using their own pre-known sub-portions. This approach of subdivision in pre-known portions/sub-portions may be particularly useful for applications where the avatar is later modified, for example when a style or color of the hair of the avatar is modified.

In some non-limiting embodiments, silhouette contour of the individual, or body contour of the individual, may be obtained with the individual naked or wearing close-fitting clothes, such as but not limited to a leotard. Layering of a plurality of point cloud three-dimensional models $306_1$ in the extrapolation and intrapolation module 222 may be used to identify the silhouette of the clothed individual by superimposing a point cloud three-dimensional model $306_1$ representing a layer of clothes, having a given thickness, over the point cloud three-dimensional model $306_1$ of the body of the individual. Elastic close-fitting clothes may be used to create a contact between the internal surface of the clothes and the (surface of the) body of the individual. At the region of contact between the clothes and the body, an area of contact may be computed by subtracting the thickness of the layer of clothes (i.e., the thickness of the point cloud three-dimensional model $306_1$ of the layer of clothes) from the acquired position of the outside of the layer of clothes (i.e., the outermost portion of the point cloud three-dimensional model $306_1$ of the layer of clothes). Where the body of the person is not in contact with the layer of clothes, the body silhouette may be extrapolated by the extrapolation and intrapolation module 222 by using either one or any combination of the following: spline curve fitting, average anatomical ratios, muscular-fatty deposit anatomical modeling, and the likes. These regions of no contact may notably be identified by the present of wrinkles or stretched flat surface into the layer of clothes. Pre-knowledge of the clothes properties, both dimensional and mechanical, may be applied to improve the point cloud three-dimensional model $306_1$ of the layer of clothes, and thus, derive a silhouette of the body of the person underneath via the corresponding derived point cloud three-dimensional model.

In other non-limiting embodiments, the analysis of motif deformation on the clothes when an elastic close-fitting leotard has been used may further be used to improve the dimensional resolution of the point cloud three-dimensional model $306_1$ of the underneath silhouette. As a non-limiting example, and where the individual wears a leotard with a multicolored horizontal fine line motif only horizontally elastic would create an object composed of a multitude of horizontal layers stacked one over the other and differentiable by its color, which is easily modeled by a stack of disks with circumferences corresponding to the detected trajectory of the associated motif line. Another non-limiting example is a staggered black and white 1 mm square motif thin iso-elastic leotard, the curvature of the surface in contact underneath may be determined by the deformation of the unitary square motif, a flat surface would results on straight edges, a cylindrical surface would round up the two edges along its axis, the curvature being proportional to the level of stretch or cylindrical arc of circle. Another approach to capture the silhouette profile underneath clothing is detecting heat generation of the body by infrared emission and associated image detectors. The thermal image can isolate the body silhouette around 37° C. from the clothes, particularly if the clothes are loose, the ambient temperature is colder and convection evacuates the heat generated by the body. An advantage of this approach is that the thermal images are taken at another wavelength range than visible color, and thus does not interfere with simultaneous visible images captured.

Weight and pressure distribution on supported body portions may be of interest in some applications, such as but not limited to: shoe sole design, ergonomic chair and furniture design and the likes. The use of weight scales in the support of the real-life object and/or person 300 during image acquisition by the synchronization/acquisition module 216 may supply complementary weight information. As a non-limiting example, an image of a semi-transparent support plate with a pressure sensitive color change system may be acquired from underneath the support to derive the weight information. Such system may take the form of a deformable flat pouch with a colored semi-transparent fluid which can be positioned over a transparent floor with a camera facing up underneath. As the real-life object and/or person 300 stands on the pouch, the fluid within may be pushed away by the weight distribution of the person, forming a thinner layer of fluid having a thickness proportional to the weight of the real-life object and/or person 300. Due to the semi-transparent nature of the fluid chosen, the shade of color captured by the camera may be proportional to the thickness of the fluid layer, and therefore to the distribution of the weight of the real-life object and/or person 300. Semi-transparent pressure sensitive color changing support may be produced in a number of ways, including but not limited to using pressure sensitive birefringence material and polarized illumination. Weight information may also be acquired by positioning a weight scale in the area where the real-life object and/or person 300 rests for image acquisition by the synchronization/acquisition module 216.

In some non-limiting embodiments, the processor 108 may execute in an animation module 230 a computer program for subdividing avatars into pre-known portions. The subdivision of the avatar into pre-known portions may correspond to a division of a human body (of which the avatar is a virtual representation) into joints and limb portions. These various pre-known portions may then be articulated with respect to each other using a musculoskeletal model in the animation module 230 in which each joint between the limbs (i.e., each connective surface between the pre-known portions) has a flexing range and the limbs are attached to each other by the joints. Non-limiting example of joints include neck, shoulders, elbows, wrists, metacarpophalangeals, interphalangeals, distal interphalangeals, hips, knees, ankles, tarsometatarsals and metarsophalangeals and the likes, each joint having an anatomical flexing range limit. The animation module 230 may therefore articulate the avatar into any posture and animate the avatar. The flexing ranges of the joints may further be personalized by the animation module 230 by coordinating image acquisition of the real-life object and/or person 300 by the synchronization/acquisition module 216 in a series of postures predefined in an animation protocol (i.e., a series of specific postures) to generate several point cloud three-dimensional models $306_1$ with joints in their extreme positions (i.e. with the flexing range at a minimum and minimum). This protocol may in turn contribute to personalize the positioning of the different joints and their respective amplitude of movement for an individual.

In other non-limiting embodiments, a musculofascial model may be applied by the animation module 230 to modify a facial expression of the avatar. A protocol comprising a series of facial expressions may be established to personalize the parameters of the musculofascial model (e.g., contraction ranges of the muscles and corresponding skin displacement, junction points for the muscles and the likes), each one of the facial expression being captured as series of bi-dimensional images $303_1$ by the synchronization/acquisition module 216 to create corresponding point cloud three-dimensional models $306_1$. A standard phrases protocol may also be applied to capture facial and mouth movement corresponding to sound pronunciation; this is particularly useful if the avatar is used into a speaking context and also helps to the musculofascial model parameterization.

In yet other non-limiting embodiments, fitting, hanging and movement behavior of the clothes worn by the individual may be modeled according to, but not limited to, their dimension, rigidity, elasticity, weight, color, motif, brightness, sewing pattern and the likes. Forces exercised on the clothes may be computed in the animation module 230 according to gravity and movement of the avatar by using a mechanical model of the clothes property above to compute clothes reactive movement. This model may enable a better representation of the dressed avatar in the virtual world. The parameters for the model may be established according to the fabric used, the sewing pattern(s) and the likes. The parameters may also be established based on acquired behavior of specific finished clothes fitting, hanging and movement behavior using an automated force and movement applied protocol to derive the parametric set corresponding (e.g., dimension, rigidity, elasticity, weight, color, motif, brightness and the likes). As a non-limiting example, a shirt may be put over an automated torso and arms made of a series of inflatable thin rings stacked one over the other. The dimensions of the shirt may be computed by inflating the pre-calibrated volume for the individual rings until they are in complete contact with the shirt without stretching the shirt. In other non-limiting examples, a point cloud three-dimensional model $306_1$ may be generated via synchronized acquisition of bi-dimensional images via the synchronization/acquisition module 216 to determine the shirt volume when the individual rings are in complete contact with the shirt without stretching the shirt and to derive its dimensions. Visual properties of the fabric (e.g., color, brightness, motif and the likes) may be derived from acquired series of bi-dimensional images $303_1$ under known illumination conditions, the series of bi-dimensional images $303_1$ being usable to generate corresponding point cloud three-dimensional models $306_1$. Elasticity may be deduced by continuing the inflation to stretch the shirt while measuring the required force to do so. Rigidity and weight may be deduced by deflating the rings to let the shirt hang loosely, and moving the automated torso and arms to apply a known force of the shirt, such as spinning the automate to create a centrifugal force for example. Acquiring synchronized series of bi-dimensional images $303_1$ to generate corresponding point cloud three-dimensional models $306_1$ during the clothes behavior protocol may facilitate obtaining realistic fitting, hanging and movement behaviors of the clothes, from which an optimized corresponding set of model parameters may be regressed.

A protocol of postures and resting points resting onto pressure sensitive optical support may also be established to model body resting parts deformation and weight distribution for applications such as, but not limited to, custom design sole, chair, armrest, backrest, mattress, gloves, touch-screen, touch command and the likes. It is appreciated that since point cloud three-dimensional models may be used to realistically modify personalized avatars, to make them take any posture and any expression, to dress them up in any clothes, to animate them and the likes, the parameters of these point cloud three-dimensional models and the avatars associated therewith may be considered personal, proprietary and confidential. Secured server storage and secured access protocols similar as those developed for personal confidential data safety in the financial, medical and legal industries for example may accordingly be used to preserve the confidential nature of such information.

It is appreciated that the processor 108 may execute in the animation module 230 anyone of the above computer programs in any sequence, any combination of the above computers programs as well as other computer programs in other embodiments.

Various Applications for Avatars

In some non-limiting embodiments, the virtual object creation system 100 may be connected via network 104 to the 3D printing system 122. The various computer programs above may be used to generate, from one or more pictures of a defunct person or animal, a global point cloud three-dimensional 307 which can in turn be communicated to the three-dimensional printing system 122 to produce a three-dimensional printed object which is a representation of the defunct person or animal. The three-dimensional printed object may be made in a number of material, such as a thermoplastic material, bronze and the likes and can be notably be used to produce funerary urns. In this specific example of implementation of the invention, the funerary urn includes a cavity to hold the ashes of the deceased person or animal and it is shaped externally as the person or animal. It is appreciated that in other non-limiting embodiments, the three-dimensional printer may be an I/O device 116 directly connected to computer unit 102 in which case the three-dimensional printed object may be printed locally.

In other non-limiting embodiments, the global point cloud three-dimensional model 307 of the defunct person or animal may be flattened to produce a cameo of the defunct person or animal. The cameo may be affixed onto funerary urns, containers and likes in which belongings and the likes of the defunct person or animal may be placed. Any other memorabilia of a person or animal may also be produced using the global point cloud three-dimensional model 307.

The avatar of the individual generated by the virtual object creation system 100 may also serve as input to the 3D printing system 122 via network 104 to create statues, busts or scenes and the likes of an individual or a scene comprising the individual. In some other embodiments, dimensional and weight support distribution information may be transferred to the server 106 comprising design software applications for products, such as, but not limited to, shoe soles, seats, mattresses, furniture, touch control panels, sport equipment, and the likes. It is appreciated that such design software may also be executed locally onto the computer unit 102.

The parametrical musculoskeletal, musculofascial and clothes behavior models above allow for further modifications of global point cloud three-dimensional model 307 through the point cloud three-dimensional models $306_1$ derived from multi-perspective series of bi-dimensional images $303_1$. The funerary urns, statues, busts or scenes discussed above may accordingly be further modified to accommodate distinct facial expressions of the individual and the likes. In other embodiments, the avatar could be modified to be thinner, younger and the likes. Three-dimensional photo albums and videos may also be created. The avatar may also be integrated into three-dimensional still or video scenes from a virtual library. The avatar may also be inserted as a personage into video games, including but not limited to virtual reality video games, using similar parametrical models by transferring these personalized parameters (e.g., musculoskeletal and musculofascial models and the likes) in addition to the reference global point cloud three-dimensional model 307 representing the individual. Using the steric models discussed above, the avatar may also be animated realistically without having the specific motions and/or expressions stored locally or remotely in a library.

In other non-limiting embodiments, the avatar and its specific parameters may be communicated via the network 104 to various software applications. Non-limiting examples of these applications comprise, but are not limited to, a virtual make-over application. Specifically, an avatar with a high resolution in the facial region of the individual may be generated and various cosmetic products, such as but not limited to lipstick, mascara and the likes, could then be applied onto the facial surface of the avatar to provide a virtual representation of the makeup color, texture and the likes. Other beauty products, as well as glasses, jewelry, hair style, hair color, accessories, clothes and the likes could also be tried. The user could rotate, zoom and interact with the avatar in a number of ways. Using the parametric model, the modified avatar may be visualized in motion, including with associated clothes behavior, thereby creating a virtual dressing room. The virtual make-over software would be well-suited for online shopping solutions and the likes.

The avatar and its specific parameters may be saved in secured servers and transferred, accessed or modified under strict confidentiality protocols with owner, usually individual represented by the avatar, permission only. Interactive interfaces, such as I/O devices 116, may be used to modify or activate the virtual avatar, such as but not limited to keyboard, mouse, touch pad, voice commands, joystick or console, camera captured movement, etc. . . . . Camera captured movement could also be used to control the avatar movement in a mimicking fashion in the virtual world. For non-limiting example, the avatar could select and put-on various clothes and mimic the real individual movement to change the screen into a mirror of a virtual changing room, that could additionally to the reality offer a full spherical view of the tried on clothes on oneself.

In a non-limiting embodiment, a virtual shopping mall may be created in which the avatar would virtually enter and shop a variety of products. While entirely online, the avatar provides the user the ability of trying any product (e.g., cosmetic products and beauty products, glasses, hair style and color, jewelleries, clothes, accessories, shoes, furniture, sport equipment and the likes) as if the user was in a real store. Additionally, the virtual shopping mall may also offer custom fit boutiques using the avatar dimension and associated global point cloud three-dimensional model 307 parameters to manufacture the personalized product and deliver it both in the virtual and in the real world.

Using image acquisition techniques with a leotard, the virtual shopping mall may be used to purchase of fitting clothes matching the silhouette of the individual (bathing suits and the likes).

Various Applications for Three-Dimensional Models Other than Avatars

Using the steric algorithms above, global point cloud three-dimensional models 307 of objects may be positioned within a three-dimensional space. Objects may be positioned side-by-side, on top of each other and the likes, but cannot overlap in any spatial coordinate. The weight of the objects may also be taken into account. The global point cloud three-dimensional models 307 may be based on design or manufacturing software or derived from synchronized series of bi-dimensional images $303_1$ using the computer programs above. This has application for storage purposes, notably warehouse storage and warehouse logistics applications and the likes to ensure that space usage is optimized and secured along with continuous location mapping. Similar functionalities may be beneficial for other storage applications, such as closets, racks, shelves, fridges (including intelligent fridge for grocery shopping automation) or interior/exterior design applications, including paint, wall papers and the likes. This has application for virtual visits of properties, as well as for virtual reorganization of a property/room by inserting, for example, global point cloud three-dimensional models 307 of furniture and the likes.

It is appreciated that all information related to a global point cloud three-dimensional model 307 may be saved and stored locally on the computer unit 102 or on the server 104 (e.g., on a cloud-based service), therefore making these software applications compatible for e-commerce order specification generation.

It is appreciated that the processor 108 may execute the computer programs stored in the various modules disclosed previously, in any order and sequence, in any combination, in any pattern and the likes. Also, while the computer programs were described within the context of specific modules, it is appreciated that all the computer programs above may be stored in one or more modules or even in all modules, locally or remotely, and all these possible variations are intended to fall within the scope of the present disclosure.

It will be apparent that obvious variations or modifications may be made which are in accordance with the spirit of the invention and which are intended to be part of the invention, and any and such obvious variations or modifications are therefore within the scope of the invention. Although the invention is described above with reference to specific embodiments, it will be appreciated that it is not limited to those embodiments and may be embodied in other forms.

The invention claimed is:

1. A system for creating a virtual object, the system comprising:
 a) A database comprising at least two series of bi-dimensional images of an object;
 b) Non-transitory program code stored in a machine readable medium for execution by a Central Processing Unit (CPU) for:
  i) Deriving from the at least two series of bi-dimensional images at least two points clouds, each point cloud corresponding to a set of (x, y, z) points;
  ii) Generating from the at least two point clouds at least two point cloud three-dimensional models, each point cloud three-dimensional model comprising a set of (x, y, z) points;
  iii) Generating from the at least two point cloud three-dimensional models a global point cloud three-dimensional model, the global point cloud three-dimensional model comprising a set of (x, y, z) points; and
  iv) optimizing the global point cloud three-dimensional model, wherein the optimizing comprises minimizing a residue for the property of each point of the global point cloud three-dimensional model, the minimizing of the residue including computing an absolute value of a difference between the property at each point in one of the at least two point clouds and the property at a corresponding point in one of the three-dimensional models.

2. The system of claim 1, wherein the property is a coordinate.

3. The system of claim 1, wherein the property is a color.

4. The system of claim 1, wherein the property is a texture.

5. The system of claim 1, wherein the property is a perspective.

6. The system of claim 1, wherein the property is an illumination condition.

7. The system of claim 1, wherein the at least two series of bi-dimensional images of the object are obtained using a photogrammetry method.

8. The system of claim 1, wherein the object is a person.

9. The system of claim 8, wherein the person is wearing close-fitted clothes with motifs to enhance volume deformation.

10. The system of claim 8, wherein the person is wearing close-fitted clothes with motifs to serve as reference markers to stitch together the bi-dimensional images.

11. The system of claim 8, wherein the virtual object is an avatar.

12. A method of using the system of claim 1, comprising using the system for virtual dressing room applications.

* * * * *